United States Patent
Polosatov et al.

(10) Patent No.: US 12,282,739 B2
(45) Date of Patent: Apr. 22, 2025

(54) SYSTEMS, METHODS, AND STORAGE MEDIA FOR PREVENTING COMPLIANCE VIOLATING MESSAGES FROM BEING COMMUNICATED TO A RECIPIENT

(71) Applicant: FairWords, Inc., Longmont, CO (US)

(72) Inventors: Vadim Polosatov, Ulyanovsk (RU); Jonathan Moskowitz, Lakewood, CO (US)

(73) Assignee: FairWords, Inc., Longmont, CO (US)

(*) Notice: Subject to any disclaimer, the term of this patent is extended or adjusted under 35 U.S.C. 154(b) by 303 days.

(21) Appl. No.: 18/111,448

(22) Filed: Feb. 17, 2023

(65) Prior Publication Data
US 2023/0385545 A1    Nov. 30, 2023

Related U.S. Application Data

(60) Provisional application No. 63/311,066, filed on Feb. 17, 2022.

(51) Int. Cl.
*G06F 40/284* (2020.01)
*G06F 40/205* (2020.01)

(52) U.S. Cl.
CPC .......... *G06F 40/284* (2020.01); *G06F 40/205* (2020.01)

(58) Field of Classification Search
USPC ..................................................... 704/1–504
See application file for complete search history.

(56) References Cited

U.S. PATENT DOCUMENTS

| | | |
|---|---|---|
| 7,028,259 B1 | 4/2006 | Jacobson |
| 7,702,536 B1 | 4/2010 | Alabraba et al. |
| 7,756,843 B1 | 7/2010 | Palmer |
| 7,827,165 B2 | 11/2010 | Abernethy, Jr. et al. |
| 7,933,960 B2 | 4/2011 | Chen et al. |
| 8,762,280 B1 | 6/2014 | Bennett et al. |
| 8,918,466 B2 | 12/2014 | Yu |
| 8,965,752 B2 | 2/2015 | Chalmers et al. |

(Continued)

OTHER PUBLICATIONS

"4.2 The Regular Expression Tagger", 2 pages, online available at <http://www.nltk.org/book/ch05.html>, retrieved on: Apr. 4, 2018.

(Continued)

*Primary Examiner* — Marcus T Riley
(74) *Attorney, Agent, or Firm* — NOD Law PC

(57) ABSTRACT

A method for analyzing a digital message for presence of a non-compliant expression within the digital message is disclosed. The digital message may be created using a computing device including a text input hardware device and may contain at least one segment. The method includes capturing keystrokes at the text input hardware device, analyzing the keystrokes to capture the digital message including an end of the segment, and assessing the segment for presence of a concept flag in at the segment, wherein the concept flag is associated with the non-compliant expression. Assessing may include obtaining a relation pattern for the concept flag, generating a dependency parse graph for the segment, and comparing the dependency parse graph to the relation pattern. If at least a portion of the dependency parse graph matches the relation pattern, then concluding that the segment contains the concept flag associated with the non-compliant expression.

16 Claims, 21 Drawing Sheets

(56) References Cited

U.S. PATENT DOCUMENTS

| | | | |
|---|---|---|---|
| 9,009,834 B1 | 4/2015 | Ren et al. | |
| 9,037,967 B1 | 5/2015 | Al-Jefri et al. | |
| 9,235,629 B1 | 1/2016 | Jones et al. | |
| 9,852,215 B1 | 12/2017 | Sullivan et al. | |
| 10,120,859 B2* | 11/2018 | Parikh | H04L 67/30 |
| 10,289,678 B2* | 5/2019 | Parikh | G06F 40/274 |
| 10,305,831 B2* | 5/2019 | Parikh | H04L 51/212 |
| 10,706,232 B2* | 7/2020 | Parikh | H04L 65/40 |
| 11,301,628 B2* | 4/2022 | Parikh | G06F 40/30 |
| 11,501,068 B2* | 11/2022 | Parikh | H04L 65/40 |
| 11,556,696 B2* | 1/2023 | Chopdekar | G06F 40/106 |
| 11,886,800 B1* | 1/2024 | Wang | G06F 40/166 |
| 12,029,574 B2* | 7/2024 | Arroyo-Gallego | A61B 5/4082 |
| 12,124,490 B2* | 10/2024 | Joseph | G06Q 30/018 |
| 2004/0193557 A1 | 9/2004 | Olsen | |
| 2004/0215449 A1 | 10/2004 | Roy | |
| 2007/0282814 A1 | 12/2007 | Gupta | |
| 2008/0091408 A1 | 4/2008 | Roulland et al. | |
| 2008/0208567 A1 | 8/2008 | Brockett et al. | |
| 2009/0006950 A1 | 1/2009 | Gross et al. | |
| 2010/0125897 A1 | 5/2010 | Jain et al. | |
| 2010/0169769 A1 | 7/2010 | Jimenez et al. | |
| 2010/0318318 A1 | 12/2010 | Spiesberger | |
| 2010/0318903 A1 | 12/2010 | Ferren | |
| 2011/0238979 A1 | 9/2011 | Harp et al. | |
| 2012/0066763 A1 | 3/2012 | Mchugh et al. | |
| 2012/0078612 A1 | 3/2012 | Kandekar et al. | |
| 2012/0079372 A1 | 3/2012 | Kandekar et al. | |
| 2012/0179682 A1 | 7/2012 | De Saeger et al. | |
| 2012/0191792 A1 | 7/2012 | Chebiyyam | |
| 2012/0209751 A1 | 8/2012 | Chen et al. | |
| 2012/0297317 A1 | 11/2012 | Radom et al. | |
| 2013/0110748 A1 | 5/2013 | Talati et al. | |
| 2013/0120267 A1 | 5/2013 | Pasquero et al. | |
| 2013/0238318 A1 | 9/2013 | Enoki et al. | |
| 2013/0253910 A1 | 9/2013 | Turner et al. | |
| 2013/0339457 A1 | 12/2013 | Freire et al. | |
| 2014/0047234 A1 | 2/2014 | Davis et al. | |
| 2014/0047556 A1 | 2/2014 | Davis | |
| 2014/0143268 A1 | 5/2014 | Finkelstein et al. | |
| 2014/0278361 A1 | 9/2014 | Pak et al. | |
| 2015/0026760 A1 | 1/2015 | Lipman | |
| 2015/0033283 A1 | 1/2015 | Mulder | |
| 2015/0089578 A1 | 3/2015 | Schofield | |
| 2015/0154184 A1 | 6/2015 | Bahgat et al. | |
| 2015/0172243 A1 | 6/2015 | Parikh et al. | |
| 2016/0006680 A1 | 1/2016 | Chebiyyam | |
| 2016/0063874 A1 | 3/2016 | Czerwinshi et al. | |
| 2016/0147731 A1* | 5/2016 | Parikh | G06F 40/274 715/261 |
| 2016/0196150 A1 | 7/2016 | Jing et al. | |
| 2017/0103231 A1 | 4/2017 | Lipman | |
| 2017/0300472 A1* | 10/2017 | Parikh | H04L 51/046 |
| 2019/0220512 A1* | 7/2019 | Parikh | H04L 51/046 |
| 2020/0285809 A1* | 9/2020 | Parikh | G06F 40/205 |
| 2020/0394361 A1* | 12/2020 | Parikh | G06F 40/274 |
| 2023/0385545 A1* | 11/2023 | Polosatov | G06F 40/205 |
| 2024/0177183 A1* | 5/2024 | Miguel | G06F 40/30 |

OTHER PUBLICATIONS

Ex Parte Quayle Action received for U.S. Appl. No. 15/640,471 dated Dec. 31, 2018, 8 pages.
Final Office Action received for U.S. Appl. No. 14/572,714 dated Sep. 8, 2017, 21 pages.
Hevly, Lou "Regex Dictionary", Visca.com, 1 page, online available at <https://visca.com/regexdicl/>, retrieved on: Apr. 4, 2018.
Non Final Office Action received for U.S. Appl. No. 14/572,714 dated Apr. 18, 2018, 27 pages.
Non Final Office Action received for U.S. Appl. No. 14/572,714 dated Jan. 3, 2017, 24 pages.
Non Final Office Action received for U.S. Appl. No. 15/005,132 dated Sep. 27, 2017, 19 pages.
Non Final Office Action received for U.S. Appl. No. 15/640,471 dated Mar. 22, 2018, 21 pages.
Non Final Office Action received for U.S. Appl. No. 16/363,429 dated Feb. 21, 2020, 18 pages.
Non Final Office Action received for U.S. Appl. No. 16/884,878 dated Aug. 17, 2021, 6 pages.
Notice of Allowance received for U.S. Appl. No. 15/005,132 dated Jun. 26, 2018, 5 pages.
Notice of Allowance received for U.S. Appl. No. 15/640,471 dated Mar. 13, 2019, 5 pages.
Notice of Allowance received for U.S. Appl. No. 16/363,429 dated Mar. 12, 2020, 5 pages.
Notice of Allowance received for U.S. Appl. No. 16/884,878 dated Jan. 18, 2022, 17 pages.
Notice of Allowance received for U.S. Appl. No. 17/003,715 dated Jul. 22, 2022, 9 pages.
Response filed on Feb. 8, 2018 for Final Office Action of U.S. Appl. No. 14/572,714 Mail received dated Sep. 8, 2017, 12 pages.
Response filed on Feb. 24, 2020 for Non Final Office Action of U.S. Appl. No. 16/363,429 Mail received dated Feb. 21, 2020, 9 pages.
Response filed on Feb. 27, 2018 for Non Final Office Action of U.S. Appl. No. 15/005,132 Mail received dated Sep. 27, 2017, 13 pages.
Response filed on Jan. 30, 2019 for Ex Parte Quayle Action of U.S. Appl. No. 15/640,471 Mail received dated Dec. 31, 2018, 13 pages.
Response filed on Jun. 5, 2017 for Non Final Office Action of U.S. Appl. No. 14/572,714 Mail received dated Jan. 3, 2017, 11 pages.
Response filed on Mar. 8, 2018 for Final Office Action of U.S. Appl. No. 14/572,714 Mail received dated Sep. 8, 2017, 12 pages.
Response filed on Sep. 14, 2018 for Non Final Office Action of U.S. Appl. No. 14/572,714 Mail received dated Apr. 18, 2018, 11 pages.
Response filed on Sep. 14, 2018 for Non Final Office Action of U.S. Appl. No. 15/640,471 Mail received dated Mar. 22, 2018, 13 pages.
The Stanford Natural Language Processing Group, "Neural Network Dependency Parser", 6 pages, online available at <https://nlp.stanford.edu/software/nndep.shtml>, retrieved on: Apr. 4, 2018.

* cited by examiner

500-a

-- Text to annotate --

I'm thinking about setting the indices.
I don't want to manipulate the market.
I think this index is getting pushed.
I want to set the appointment with the doctor about my broken index finger.

-- Annotations --

[depedency parse x] [lemmas x]

Lemmas:

1. [I|be] [think] [about] [set] [the] [index] [.]
   I'm thinking about setting the indices .

2. [I] [do] [not] [want] [to] [manipulate] [the] [market] [.]
   I do n't want to manipulate the market .

3. [I] [think] [this|index] [be] [get] [push] [.]
   I think this index is getting pushed .

4. [I] [want] [to] [set] [the] [appointment] [with] [the] [doctor] [about] [my] [broken] [index] [finger] [.]
   I want to set the appointment with the doctor about my broken index finger .

Enter a Semgrex expression to run against the "enhanced dependencies" above:

{lemma:/set|manipulate/}

| | |
|---|---|
| 1 | I'm thinking about setting the indices . [match] |
| 2 | I do n't want to manipulate the market . [match] |
| 3 | I think this index is getting pushed . |
| 4 | I want to set the appointment with the doctor about my broken index finger [match] |

Enter a Semgrex expression to run against the "enhanced dependencies" above:

{lemma:/set|manipulate/}=SomeLabelHere

| | |
|---|---|
| 1 | I'm thinking about setting the indices . [match / SomeLabelHere] |
| 2 | I do n't want to manipulate the market . [match / SomeLabelHere] |
| 3 | I think this index is getting pushed . |
| 4 | I want to set the appointment with the doctor about my broken index finger . [match / SomeLabelHere] |

FIG. 5I

Enter a Semgrex expression to run against the "enhanced dependencies" above:

{lemma:/set|manipulate|push/}=Action >obj {lemma:/index|market/}=Object

| | |
|---|---|
| 1 | I'm thinking about setting the indices . |
| 2 | I do n't want to manipulate the market . |
| 3 | I think this index is getting pushed . |
| 4 | I want to set the appointment with the doctor about my broken index finger . |

FIG. 5K

```
{ "parts": [
    {
      "pos": "vb[dgnbz]?",
      "score": 40,
      "words": [
        {"lemma": "set", "pos": "vb", "exclusions":
        ["settings", "setup"]},
        "push",
        "manipulate"
      ]
    },
    {
      "pos": "nnp?s",
      "score": 40,
      "words": ["index", "market"]
    }
  ],
  "patterns": [
    {
      "pattern": "{0} >obj {1}",
      "score": 110
    }
  ],
  "exampleUsage": "{0} the {1}",
  "excludedCombinations": [
    ["push", "set"],
    ["market"]
  ]
}
```

FIG. 6A 600-a 600-b

```
##PART##;vb[dgnbx]?;40
set;vb;settings setup
push
manipulate
##PART##;nnp?s?;40
index
market
##EXCLUSION##;
push;set
market
##BASICUSAGEEXAMPLE##;{0} the {1}
##PARSERULESET##;
{0} >obj {1};110
{0} <xcomp ({{}} >nsubj {1})
```

FIG. 6B

SYSTEMS, METHODS, AND STORAGE MEDIA FOR PREVENTING COMPLIANCE VIOLATING MESSAGES FROM BEING COMMUNICATED TO A RECIPIENT

REFERENCE TO RELATED APPLICATIONS

The present application claims the benefit of U.S. Provisional Patent Application No. 63/311,066, filed Feb. 17, 2022, and titled "Systems, Methods and Storage Media for Preventing Compliance Violating Messages from Being Communicated to a Recipient."

Further, the present application is related to U.S. Provisional Application No. 62/891,850, filed Aug. 26, 2019, and titled "MESSAGE SENTIMENT ANALYZER AND FEEDBACK." The present application is also related to U.S. patent application Ser. No. 16/884,878, filed May 27, 2020, and titled "SYSTEMS, METHODS, AND APPARATUS FOR LINGUISTIC ANALYSIS AND DISABLING OF STORAGE," which claims priority to U.S. patent application Ser. No. 16/363,429 titled "SYSTEMS, METHODS, AND APPARATUS FOR LINGUISTIC ANALYSIS AND DISABLING OF STORAGE," filed Mar. 25, 2019, and issued as U.S. Pat. No. 10,706,232 on Jul. 7, 2020, which claims priority to U.S. patent application Ser. No. 15/640,471, titled "SEMANTIC ANALYZER FOR TRAINING A POLICY ENGINE," filed Jul. 1, 2017, and issued as U.S. Pat. No. 10,289,678 on May 14, 2019, claiming priority to U.S. Provisional Application No. 62/357,925, filed Jul. 1, 2016, and titled "LINGUISTIC ANALYSIS AND LEARNING FOR POLICY ENGINE." U.S. patent application Ser. No. 15/640,471 is also a continuation-in-part of U.S. patent application Ser. No. 15/005,132, titled "MESSAGE SENTIMENT ANALYZER AND FEEDBACK," filed Jan. 25, 2016, and issued as U.S. Pat. No. 10,120,859 on Nov. 6, 2018, claiming priority to U.S. Provisional Application No. 62/107,237, filed Jan. 23, 2015, and titled, "MESSAGE SENTIMENT ANALYZER AND FEEDBACK." U.S. patent application Ser. No. 15/005,132 is also a continuation-in-part of U.S. patent application Ser. No. 14/572,714, filed Dec. 16, 2014, and titled, "COMPLIANCE MECHANISM FOR MESSAGING," which issued as U.S. Pat. No. 10,305,831 on May 28, 2019, claiming priority to U.S. Provisional Application No. 61/916,563, filed Dec. 16, 2013, and titled, "COMPLIANCE MECHANISM FOR MESSAGING." All of the above referenced applications and patent publications are incorporated hereby in their entirety by reference.

FIELD OF THE INVENTION

The present invention relates to digital message analysis. In particular, but not by way of limitation, the present invention relates to compliance with digital messaging policies.

DESCRIPTION OF RELATED ART

Email, instant messages, chat room messages, and phone calls at work can be a source of liability on companies for communications by their employees, even when those communications are against company policy. For instance, transcripts of non-compliant personal conversations over company email led the board of The Boeing Company to demand the CEO's resignation in 2005. Although he had led the company well, having sent a personal message containing language outside of company policy, he was deemed to be no longer able to serve as an example for the rest of the company.

While companies typically employ compliance guidelines to discourage employees from sending inappropriate messages, such compliance mechanisms typically are ineffective because they rely on the employees to self-police their own activities. While some software-based compliance mechanisms exist, these software solutions generally analyze communications after the fact rather than helping to prevent non-compliant communication from being sent. In yet other cases, some software-based compliance mechanisms create pre-defined flags using keywords. However, not all flags can be effectively detected by keywords alone. For instance, some words are only problematic in a particular context, leading to numerous false positives. Additionally, some flags are difficult to describe using regular expressions.

There is therefore a need for a refined system that informs and educates users regarding messages inconsistent with company policies and/or practices, and also helps prevent non-compliant messages from being communicated to a recipient.

SUMMARY OF THE INVENTION

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In an embodiment, a method for analyzing a digital message for presence of a non-compliant expression within the digital message is disclosed. The digital message may be created using a computing device including a text input hardware device and may contain at least one segment. The method includes capturing keystrokes at the text input hardware device, and analyzing the keystrokes to capture the digital message including an end of the segment. The method further includes assessing the segment for presence of a concept flag in at the segment, wherein the concept flag is associated with the non-compliant expression. In certain embodiments, assessing includes obtaining a relation pattern for the concept flag, generating a dependency parse graph for the segment, and comparing the dependency parse graph to the relation pattern. If at least a portion of the dependency parse graph matches the relation pattern, then concluding that the segment contains the concept flag associated with the non-compliant expression.

In certain embodiments, the method further includes blocking the segment containing the non-compliant expression from being transmitted from the computing device. In certain embodiments, the segment includes a plurality of portions, and blocking includes providing a block threshold value, assigning a score to each portion of the segment based on the assessing, summing the scores of the portions to generate a sum score, and comparing the sum score to the block threshold value. If the sum score exceeds the block threshold value, then the segment including the concept flag is precluded from being transmitted from the computing device.

In certain embodiments, the method further includes displaying a notification on the computing device, the notification including an indication of the non-compliant expression contained in the segment.

In an embodiment, a system for analyzing a digital message for presence of a non-compliant expression within the digital message is disclosed. The digital message may be created using a computing device including a text input hardware device. The system includes one or more processing devices and memory communicatively coupled with and readable by the one or more processing devices. The memory includes processor-readable instructions which, when executed by the one or more processing devices, cause the one or more processing devices to perform actions including capturing keystrokes at the text input hardware device associated with creation of the digital message, the digital message including at least one segment. The actions further include analyzing the keystrokes to capture the at least one segment and identifying an end of the segment, and assessing the segment for presence of a concept flag in the at least one segment, the concept flag being associated with the non-compliant expression. If the concept flag is present in the at least one segment, then the actions further include obtaining a relation pattern for the concept flag, generating a dependency parse graph for the at least one segment, and comparing the dependency parse graph to the relation pattern. The actions further include, if at least a portion of the dependency parse graph matches the relation pattern, then concluding the at least one segment contains the non-compliant expression.

In another aspect, one or more non-transitory, machine-readable media having machine-readable instructions thereon is disclosed. In accordance with certain embodiments, the machine-readable instructions, when executed by one or more processing devices, cause the one or more processing devices to perform actions including capturing keystrokes at a text input hardware device associated with creation of a digital message, the digital message including at least one segment. Actions may further include analyzing the keystrokes to capture the segment, and assessing the at least one segment for presence of a concept flag in the at least one segment, the concept flag being associated with a non-compliant expression. If the concept flag is present in the at least one segment, then the actions may further include obtaining a relation pattern for the concept flag, generating a dependency parse graph for the at least one segment, and comparing the dependency parse graph to the relation pattern. If at least a portion of the dependency parse graph matches the relation pattern, then actions may further include concluding the at least one segment contains the concept flag associated with the non-compliant expression.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

The flowcharts and block diagrams in the following figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 5A shows several sentences to be analyzed by the system of the present disclosure, in accordance with an embodiment.

FIG. 5B shows the results of a lemmatization analysis of the sentences in FIG. 5A, in accordance with an embodiment.

FIG. 5G shows another exemplary analysis output, in accordance with an embodiment.

FIG. 5H shows still another exemplary analysis output, in accordance with an embodiment.

FIG. 5I shows a dependency parse graph and yet another exemplary analysis output, in accordance with an embodiment.

FIG. 5K shows another exemplary analysis output, in accordance with an embodiment.

FIG. 6A shows a portion of exemplary code for configuring a concept flag, in accordance with an embodiment.

FIG. 6B shows a portion of another exemplary for configuring a concept flag, in accordance with an embodiment.

Figure 1:
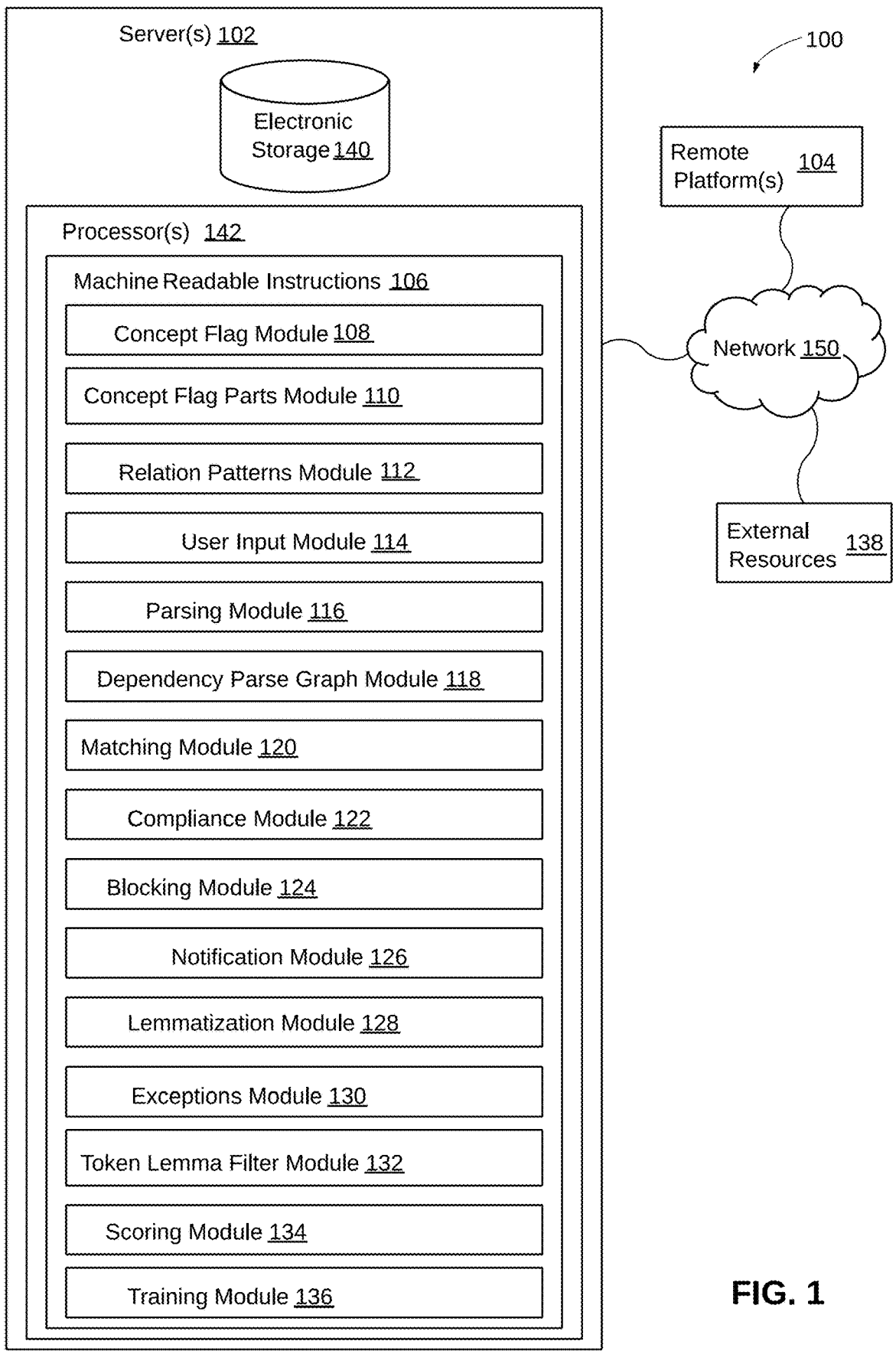
FIG. 1 illustrates an endpoint monitor system, in accordance with an embodiment.

For simplicity and clarity of illustration, the drawing figures illustrate the general manner of construction, and descriptions and details of well-known features and techniques may be omitted to avoid unnecessarily obscuring the embodiments detailed herein. Additionally, elements in the drawing figures are not necessarily drawn to scale. For example, the dimensions of some of the elements in the figures may be exaggerated relative to other elements to help improve understanding of the described embodiments. The same reference numerals in different figures denote the same elements.

The word "exemplary" is used herein to mean "serving as an example, instance, or illustration." Any embodiment described herein as "exemplary" is not necessarily to be construed as preferred or advantageous over other embodiments. In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or apparatuses. The following detailed description is therefore not to be taken in a limiting sense, and the scope of the present disclosure is defined by the appended claims and their equivalents. The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are sometimes described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable in most cases.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases, the distinction between the method operations in operating a computer and the method of computation itself should be recognized. One or more embodiments of the present invention relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher-level coding of the instructions that is interpreted to obtain the actual computer code. The software module may also include a hardware component, wherein some aspects of the algorithm are performed by the circuitry itself rather as a result of an instruction.

Some embodiments of the present invention rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

For example, in the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data, messages, and often state information using a computer network, or multiple networks. It should be appreciated that in a client/server architecture for distributed computing, there are typically multiple servers and multiple clients, and they do not map to each other and further there may be more servers than clients or more clients than servers. A server is typically designed to interact with multiple clients. In some instances, the term "client" may be used to refer to a user device, such as a laptop, a smartphone, a NetBook, etc.

In networks, bi-directional data communication (i.e., traffic) occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

DETAILED DESCRIPTION OF THE INVENTION

In the current workplace, a variety of corporate guidelines and policies may exist for promotion of a positive workplace culture. As an example, Diversity, Equity and Inclusion (DEI) is a term used to describe programs and policies that encourage representation and participation of diverse groups of people, including people of different genders, races and ethnicities, abilities and disabilities, religions, cultures, ages, and sexual orientations and as well as diverse backgrounds, experiences, and skills and expertise. To promote DEI awareness, companies may create policies and practices to reduce issues related to, for example, discrimination based on gender bias, agism, racial tensions, insensitivity regarding disabilities, and other factors. In addition to DEI programs, examples of programs, policies, and/or procedures used to promote a healthy and positive workplace may include: anti-harassment, anti-bullying (e.g., related to the use of profanity, threatening, intimidating, or toxic language, and workplace violence), awareness of conflicts of interest and bribery (e.g., compliance with the Department of Justice Foreign Corrupt Practices Act (FCPA)), anti-trust and trade compliance (e.g., compliance with the Department of State International Traffic in Arms Regulations (ITAR)), prevention of US Securities and Exchange Commission violations, sentiment analysis related to corporate culture, drugs and alcohol safety, compliance with Health Insurance Portability and Accountability Act (HIPAA), compliance with employment laws, cyber security and information security, data privacy and/or protection (e.g., compliance with the European Union General Data Protection Regulations (GDPR)), as well as assessing language associated with claims, guarantees, contracts, and sales, to name a few non-limiting examples.

Such corporate guidelines and policies may help improve morale and productivity among employees while reducing corporate risk, such as the risk of negative press (as in the example of the Boeing Corporation CEO), workplace violence, and legal exposure. However, as described above, compliance with corporate guidelines and policies may be difficult to enforce, particularly as related to intra- and inter-corporate communications.

Current compliance mechanism techniques and software are lacking in several regards. For instance, while software-based compliance systems may be useful in flagging specific trigger words, such as curse words, derogatory terminology, and other terms that may be against corporate policy, existing software-based compliance mechanisms fail to consider one or more of word alternatives, forms of the word, and context. As an example, a financial services company may have corporate policies against discussions of manipulating the market, and the use of sentences such as "I'm thinking of setting the index" or "Let's manipulate the market" in intra- and inter-company communications may put the company at risk if an investigation were to find the use of such messaging. However, screening software may not flag potentially non-compliant messages if it does not take into account synonyms or alternative terminology (e.g., alternatives or synonyms for the word "set" such as "correct" or "put right"), forms of the word (e.g., the word "setting" is a form of "set"), use of slang (e.g., using the term "fudging" or "monkeying with" in place of "setting"), and context.

In a more detailed example, an employer may wish to detect communication messages in which an employee refers to setting the market index, such as exemplified in the following phrases: "set the index," "setting this index," "index to set," "this index is getting set," to name a few non-limiting examples. In some cases, two separate flags, namely, "set" and "index" may be created to be detected by a message monitoring software. However, these flags may create multiple false positives, since the two words "set" and "index" are fairly common in English and frequently used in contexts outside of market index manipulation. Further, even if a flag is created for the word "set," the software may not detect a match if an alternative word such as "setting" or "adjust" is used instead. In some circumstances, the employee may also wish to monitor for specific phrases, such as "manipulate the index" and/or "manipulate the market," or for specialty terms such as stock tickers, all of which phrases and terms may have alternative expressions, synonyms, tenses, and/or verb forms. For instance, Or the term "went," which is the past tense form of the irregular verb "go," may not be flagged if the software is set only to recognize the specific word "go." Numerous compliance systems currently used also fail to take context into account. As another example, the phrase "Set the appointment with the doctor about my broken index finger" includes both "set" and "index" therein, which could cause some compliance systems to flag this innocuous sentence, thus returning a false positive result.

To overcome such issues, some software-based compliance mechanisms generate an alert when the two words, e.g., set and index, are used in proximity with each other (e.g., within a threshold number of words from each other in a sentence). For instance, a criteria for the alert may include a parameter such as "set w/10 index," i.e., the word "set" should be within ten words of the word "index." However, this approach may not identify instances where the flags are separated by more than ten words or span across multiple sentences, such as "I talked to John about that index on the phone yesterday at length. He said he wants to set it tomorrow."

In some existing techniques, the text or paragraph to be evaluated are split into separate sentences, then a software may screen for specified flags within each sentence. Each sentence are often considered in isolation from each other due to the complexity in detecting flags spanning across multiple sentences, thus leading to unreliable results. To further add to the complexity, whereas a typical sentence may include six to eight words, instant messages (IMs) frequently used in business communications are often fragmented and may each be evaluated as one sentence, without considering the preceding and following IMs that may provide useful context for each IM.

The present disclosure relates generally to a system for digital message analysis. In particular, but not by way of limitation, the present disclosure relates to systems, methods, and apparatuses for informing and educating users regarding messages inconsistent with enterprise policies and/or practices. In some cases, the present disclosure also relates to systems, methods, and apparatuses for identifying non-compliant digital messages and preventing non-compliant messages from being communicated to a recipient and/or being saved to the device on which a given one of the non-compliant messages is being created.

Certain aspects of the present disclosure relate to a compliance platform configured for identifying, warning, and/or training a user in real-time regarding issues with compliance with enterprise policies and/or messaging practices. In some examples, the system may provide the user documentation related to company policies, use cases, and even recommendations for additional verbiage to steer the user away from composing and sending non-compliant, high-risk digital communications. Some aspects of the present disclosure also relate to an endpoint monitor (referred to as EPM, analysis system or, simply, system, such as system 100 shown in FIG. 1), which detects in real time when users are composing non-compliant, high-risk communications, in certain embodiments.

In some cases, the system may be customizable according to the compliance rules and practices of a specific enterprise or company. Further, the system may provide coaching to the user on appropriate messaging verbiage according to company policy, before allowing the user to send the message. For instance, the system may guide users in training and education related to communication policy compliance and violations, in certain embodiments in real-time. In some embodiments, the system may also evaluate digital messages against negative sentiments, thereby promoting positive communications amongst the employees. In some examples, when words and phrases indicating negative sentiments are detected, the system may warn and educate the user of the incompatibility or inappropriateness of their word or phrase selection in view of company policies and practices. The system may also request the user to modify verbiage in the message or, alternatively, block the message from being sent without modification.

In some embodiments, the system may be configured to assign a score to the wording used by the user in a message. The score may be used in determining compliance of the message with company policy and/or to block the message from being sent from the user's messaging application. The score may also be used a measure of the user's compliance with company messaging policy. Further, the system may calculate a score for the company (or a group within a company) based on an aggregate of scores for all or some of the users monitored by the system. Further, the system may also provide a comparison of company scores compared to peers, for instance, with respect to other companies who have also implemented similar analyses. In some cases, the system may be configured to increment or decrement the calculated scores based on positive or negative sentiments assessed by the system. For example, messages with positive sentiments (e.g., "Good work," "nice job," and "Congratulations on our team's success, let's plan a celebratory lunch") may result in added points toward the score, while messages that violate company policy or include words typically associated with adverse behavior such as bullying or harassment, may reduce the calculated score. The overall company score (also referred to as company health score, health score or, simply, score) may take into account the increments and decrements based on the positive and negative sentiments detected by the system and presented to the user and/or the company as a numerical score or, alternatively, a grade.

In some embodiments, the present disclosure describes an application (e.g., app, such as mobile app, web app, desktop app, etc.) configured to link with at least one communications platform, such as an instant messaging platform (e.g., SKYPE® software and MICROSOFT TEAMS® software available from Microsoft Corporation, SLACK® messaging service available from Salesforce, Inc., and others), an email platform (e.g., MICROSOFT OUTLOOK® software available from Microsoft Corporation, GMAIL™ email service available from Google LLC, and others), or another applicable platform (e.g., an app for text messaging or Short Messaging Service (SMS)). The application may run on a computing system and enable the computing system to more accurately identify desirable or undesirable sentiments or non-compliant language in messages than is possible in existing computing systems.

In some examples, the application may be hosted, stored, and/or executed on a server (e.g., server(s) 102 in FIG. 1), a user device (e.g., remote platform 104 in FIG. 1), or a combination thereof. In some embodiments, the software application may be in communication with another software app (such as a communications app or platform) via an Application Programming Interface (API). In other cases, a software application of the compliance platform described herein may be fully integrated with another software app to behave as a unified entity. In some cases, for instance, when the software application is installed on a user device (e.g., a smartphone, a desktop), it may run in the background and analyze messages being typed in real-time. For instance, the software application may be configured to capture keystrokes as the user composes the message, and performing the analysis at specific junctures within the message (e.g., upon detection of the typing of a comma or a period, hitting the return key on a keyboard, selecting "send" in a messaging application). Further, the software application may display notifications via a separate interactive user interface (UI), examples of which are further described in relation to FIGS. 7A-7C below. For instance, the UI on a user device may display information pertaining to a potentially problematic word or phrase in a message as the user is composing the message. In addition, or as an alternative to the real-time analysis, the system may also analyze archived communications data such as electronic mail messages and attachments after the communication has already been sent. In certain embodiments, analysis of archived data may serve as an additional way to gauge an overall score for an employee or a company.

Additional embodiments of the disclosure relate to preventing non-compliant messages from being saved to or sent from the device on which the non-compliant messages are being created. Yet other embodiments may relate to flagging employees who are using an inappropriate verbiage to conduct business, scoring individuals or companies based on their communications (e.g., using real-time or archived communications related data), and providing access to training and insight on how to improve those scores.

Throughout the present disclosure, the terms "concept flag" and "phrase template" may be used interchangeably. In some cases, concept flags or phrase templates may include one or more parts, such as an action and an object. For instance, a part of a concept flag (also referred to as a concept flag part) may refer to a set of word alternatives that can be detected in a particular semantic role. In some cases, each concept flag may have a plurality of parts, and each part may have a plurality of word alternatives. In some embodiments, aspects of this disclosure relate to identifying within a phrase a specific subset of actions being performed on a specific set of objects. It should be noted that, in some cases, concept flags may include more than two parts while, alternatively, a concept flag may include a single part. Generally, the term "Action" refers to a verb (e.g., set, change, push, manipulate, etc.) and its alternative word forms (i.e., inflections). Further, the term "Object" refers to a noun (e.g., index, market, price, etc. and its alternative word forms (i.e., inflections)).

Further, in the present disclosure, the term "word" and "token" may be used interchangeably within the context of the analysis system and algorithms associated therewith.

The embodiments described herein may begin with an initial flagging of a particular sentence for further processing. For example, in the above example where a particular sentence may only be deemed problematic when the sentence includes both of the words "set" and "index," such as "I want to set the index," an exemplary analysis system may select it as a candidate for further processing, in accordance with an embodiment. In some examples, the exemplary analysis system may be further configured to evaluate alternatives of the word "set," such as "manipulate," "change," "push," and others. Similarly, for the word "index," one or more alternatives (e.g., "market," "price," etc.) may also be evaluated, as an example.

In certain embodiments, these alternative words associated with the concept flag "set the index" may be referred to as "concept flag parts." Thus, a concept flag part may refer to a set of word alternatives for detection in a particular semantic role. A concept flag may have any positive number of parts, where each part can have any positive number of word alternatives. Thus, in this example, the concept flag parts may be represented as: 1) First concept flag part (Action=set/change/push/manipulate); and 2) Second concept flag part (Object=index/market/price). Further, in one non-limiting example, the combination of parts (i.e., the relation pattern to be matched within the phrase or sentence) may be represented as "{Action} the {Object}."

In order to reliably detect flags across sentences in a rule-based manner, a conference resolution algorithm (or another applicable method) may be employed in certain embodiments. For instance, a conference resolution algorithm may be used to identify that the subjects of two separate sentences (such as the words "John" and "He" in the example sentences above) are referencing the same entity.

Additional analysis techniques may be implemented in certain embodiments of the present disclosure, as discussed in further detail below.

Lemmatization

Broadly, lemmatization may refer to the process of grouping together the inflected forms of a word so they may be analyzed as a single item identified by the word's "lemma" or dictionary form. For instance, lemmatization of the word "setting" results in the word "set," the word "went" becomes "go," and the word "indices" becomes "index." In some cases, lemmatization may involve a vocabulary and/or morphological analysis of the word. In some cases, such as computational linguistics, lemmatization may refer to the algorithmic process of determining the lemma of a word based on its intended meaning.

Accuracy of the lemmatization may depend on the correct identification of the intended part of speech (POS) and meaning of a word in a given sentence, as well as within the larger context surrounding that sentence, such as neighboring sentences or even an entire document. In other words, proper lemmatization may be contextualized by the sentence. As an example, in a sentence, "We are meeting on our Wednesday weekly meeting," the first instance of the word "meeting" is a verb, while the second instance of the word "meeting" is a noun. In such cases, the analysis software may include a lemmatizer function to lemmatize the first instance of the word "meeting" to the verb "meet," and also recognize the second instance of the word "meeting" to refer to the noun "meeting." As another example, the words "don't," "didn't," and the like may be treated as two tokens and lemmatized as "do" and "not." In some embodiments, each concept flag part's word alternative may be represented by a respective lemma of its word. In this way, a specific piece of text may be deemed to contain multiple indices instead of a single index. Lemmatization may enable the system of the present disclosure to search for the concept flag "set the index" as well as "setting the indices" with the same or similar parameter settings.

Dependency Parse

As previously noted, given the parameter settings to flag the words "set" and "index," some existing techniques will return a false positive for the sentence "I want to set the appointment with the doctor about my broken index finger." In other words, this sentence may be incorrectly identified as being problematic based on the inclusion of flagged words.

In some cases, aspects of the present disclosure include a process to generate a sentence dependency graph (also referred to as a dependency graph or a dependency tree, which terms are used interchangeably herein) to identify relations between lemmas according to context. This process enables the analysis system of the present description to label the sentence "I want to set the index" as problematic, without flagging the sentence "I want to set the appointment with the doctor about my broken index finger."

As an example, the analysis system of the present disclosure may utilize a sentence dependency parser, which is configured to receive a sentence or phrase as an input and builds a dependency graph therefrom. The dependency graph may include one or more nodes, where each node is a word within the sentence or phrase. The nodes of a dependency graph or tree may be connected by edges, such as a first edge connecting a first node and a second node, a second edge connecting the second node and a third node, and so forth. In this way, each labeled edge of the dependency graph represents a relation between two words. In some cases, an analysis of two nodes may indicate that there is a set of possible relations the two nodes. Further details of an exemplary implementation of this dependency parse process are described in relation to FIGS. 5A-5K below.

Pattern Matching

Once the system identifies the dependency parse results for the input sentence or phrase (e.g., by generating the dependency graph), the process implemented by the system may proceed to a pattern matching step. As an example, the pattern matching may involve matching the dependency parse graph to a set of patterns for the concept flag. In some cases, the patterns may also be referred to as dependency patterns or match patterns. One or more patterns may be indicated for each concept flag, and matching the dependency graph to the set of patterns may include identifying in the parse graph any sub-graph matching one of the dependency patterns. If one or more such sub-graph is matched to a dependency pattern, the system may deem the concept flag matched. In some examples, the system of the present disclosure may utilize one or more libraries (e.g., Semgrex provided by STANFORD CoreNLP, ODIN Runes provided by ODIN, to name two non-limiting examples), where the libraries assist the system in matching one or more sub-graphs in the dependency graph using a "rules" language. In some cases, this "rules" language resembles regular expressions. While the disclosure generally describes pattern matching using the Semgrex syntax, it should be noted that this is not intended to be limiting. Other libraries known in the art and/or associated with or proprietary to the system may be used to perform pattern matching in different embodiments.

FIG. 1 illustrates an endpoint monitor system, in accordance with an embodiment. In particular, FIG. 1 shows a system 100 configured for preventing non-compliant messages from being communicated to a recipient, in accordance with one or more implementations. In some cases, system 100 may also be configured for informing and educating users regarding messages inconsistent with policies or practices, in accordance with one or more implementations. In some implementations, system 100 may include one or more servers 102. Server(s) 102 (also referred to as computing platform(s) 102) may be configured to communicate with one or more client computing platforms 104 (or remote platforms 104) according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104, in an example.

Server(s) 102 may be configured by machine-readable instructions 106. Machine-readable instructions 106 may include one or more instruction modules. The instruction modules may include computer program modules. The instruction modules may include one or more of a concept flag module 108, a concept flag parts module 110, a relation patterns module 112, a user input module 114, a parsing module 116, a dependency parse graph module 118, a matching module 120, a compliance module 122, a blocking module 124, a notification module 126, a lemmatization module 128, an exceptions module 130, a token lemma filter module 132, a scoring module 134, a training module 136, and/or other instruction modules.

Concept flag module 108 may be configured to receive, from a first computing device, a concept flag. In some examples, the concept flag (e.g., "set the index") is associated with a non-compliant expression or idea. In some cases, the first computing device may be an example of client computing platform (or remote platform) 104. In some cases, the concept flag may be received over a communication link, which may be an example of a wired or wireless communication link. Further, the concept flag may be received via a user interface of the first computing device. In some embodiments, the concept flag(s) may be configurable or customizable by the client company based on use case (e.g., the client company may indicate a different set of concept flags for internal vs external communications) and/or the field or industry in which the client company operates (e.g., a pharmaceutical company may indicate a different set of concept flags than an investment bank), to name two non-limiting examples.

Concept flag parts module 110 may be configured to identify a plurality of concept flag parts (e.g., Action, Object) for the concept flag. Concept flag parts module 110 may work in conjunction with one or more of the other modules of system 100, such as user input module 114 and/or parsing module 116. For instance, parsing module 116 may parse the concept flag received by system 100, where parsing the concept flag may include identifying/detecting words, acronyms, abbreviations, phrases, etc., in the concept flag. In some cases, parsing module 116 (or another module within machine readable instructions 106) may be configured to perform Natural Language Processing (NLP) to detect and identify the language in which the concept flag is written, its content, and/or its grammatical structure, to name a few non-limiting examples.

In some embodiments, the concept flag (e.g., "set the index") is associated with a plurality of words, wherein each of the plurality of concept flag parts may include a list of words (e.g., Action: set/push/manipulate and Object: index/market), further described below in relation to FIGS. 3-6. The list of words for each of the plurality of concept flag parts may comprise one word (e.g., 'set' or 'index') of the plurality of words and one or more synonyms or word alternatives (e.g., push/manipulate for 'set', market for 'index') for the one word. In some non-limiting examples, the plurality of concept flag parts are selected from a group consisting of an Action and an Object.

In some cases, parsing module 116 (or another module of system 100, such as user input module 114) may be configured to check keystroke data signals captured from a text input hardware device of a computing device for any typographical errors (i.e., typos), non-compliant words, non-compliant phrases or sentences, a non-compliant Uniform Resource Locator (URL), or a combination thereof.

Relation patterns module 112 may be configured to receive one or more relation patterns for the concept flag. In some non-limiting examples, each of the one or more relation patterns includes a direct or indirect association between at least two of the plurality of concept flag parts. In some cases, each relation pattern for the concept flag comprises one or more match relations, wherein each of the one or more match relations comprises at least an association between a lemma in a lemma list for a first concept flag part and a lemma in a lemma list for a second concept flag part. For instance, in the above example, the lemma list for the first concept flag part (Action) may have the words set/push/manipulate, while the lemma list for the second concept flag part (Object) may have the words index/market.

User input module 114 may be configured to capture one or more keystroke data signals from a text input hardware device of a second computing device (e.g., a user device, such as a smartphone, a tablet, etc.), the one or more keystroke data signals representing at least a sentence or phrase. In some cases, user input module 114 may work in conjunction with parsing module 116 or any of the other modules described herein. In some non-limiting examples, the keystroke data signals are associated with an email, an instant message (IM), a SMS or text message, a social media message, or a social media comment. In some cases, user input module 114 may also be configured to capture voice input (e.g., a phone call; a Voice over IP or VoIP call using Skype or WhatsApp for instance) and feed the data to one or more other modules of system 100. In such cases, system 100 may comprise one or more other modules, such as a voice recognition module (e.g., for converting voice to text), for instance.

Dependency parse graph module 118 may be configured to generate a dependency parse graph for the sentence or phrase, where the dependency parse graph comprises a graph of relations between two or more words in the sentence or phrase, further described below in relation to FIGS. 3-5K. In some examples, the dependency parse graph may be generated (or updated) at an end of each sentence or phrase. For instance, the dependency parse graph may be generated when the user hits a carriage return (or enter) key, a period (or full stop), a semicolon, and/or a spacebar key on their user device.

In some examples, generating the dependency parse graph comprises identifying, for the sentence or phrase, a plurality of nodes, and one or more edges between the plurality of nodes, wherein each of the one or more edges represents a relation between two nodes of the plurality of nodes. Further, generating the dependency parse graph comprises identifying a relation pattern in the dependency graph. Dependency parse graph module 118 and/or relation patterns module 112 may be configured to identify one or more relation patterns in the dependency graph.

Matching module 120 may be configured to compare the dependency parse graph or at least one sub-graph of the dependency parse graph to at least one of the one or more relation patterns for the concept flag. In some examples, the comparing includes comparing the relation pattern in the dependency graph to the at least one of the one or more relation patterns for the concept flag. In some cases, the relation pattern in the dependency graph includes an aggregate of the one or more edges between the plurality of nodes, further described in relation to FIGS. 5A-K.

Compliance module 122 may be configured to determine, at an end of each sentence or phrase, if the sentence or phrase is non-compliant. For example, compliance module 122 may be configured to determine if the dependency parse graph or a sub-graph matches the at least one of the one or more relation patterns. If yes, the compliance module 122 deems the sentence or phrase non-compliant and flags it as such.

Blocking module 124 may be configured to preclude at least a portion of the keystroke data signal from reaching a target application in an application layer, for instance, at a layer between a hardware and the application layer of the user device. In some embodiments, blocking module 124 may prevent a message, or even portions of a message, from being saved to a non-volatile or volatile memory. In other words, blocking module 124 may be configured to prevent a non-compliant message (or non-compliant portions of a message) from being saved to the device (e.g., a smartphone, laptop, tablet, etc.) on which the non-compliant message is being created (e.g., remote platform(s) 104).

Figure 7A:
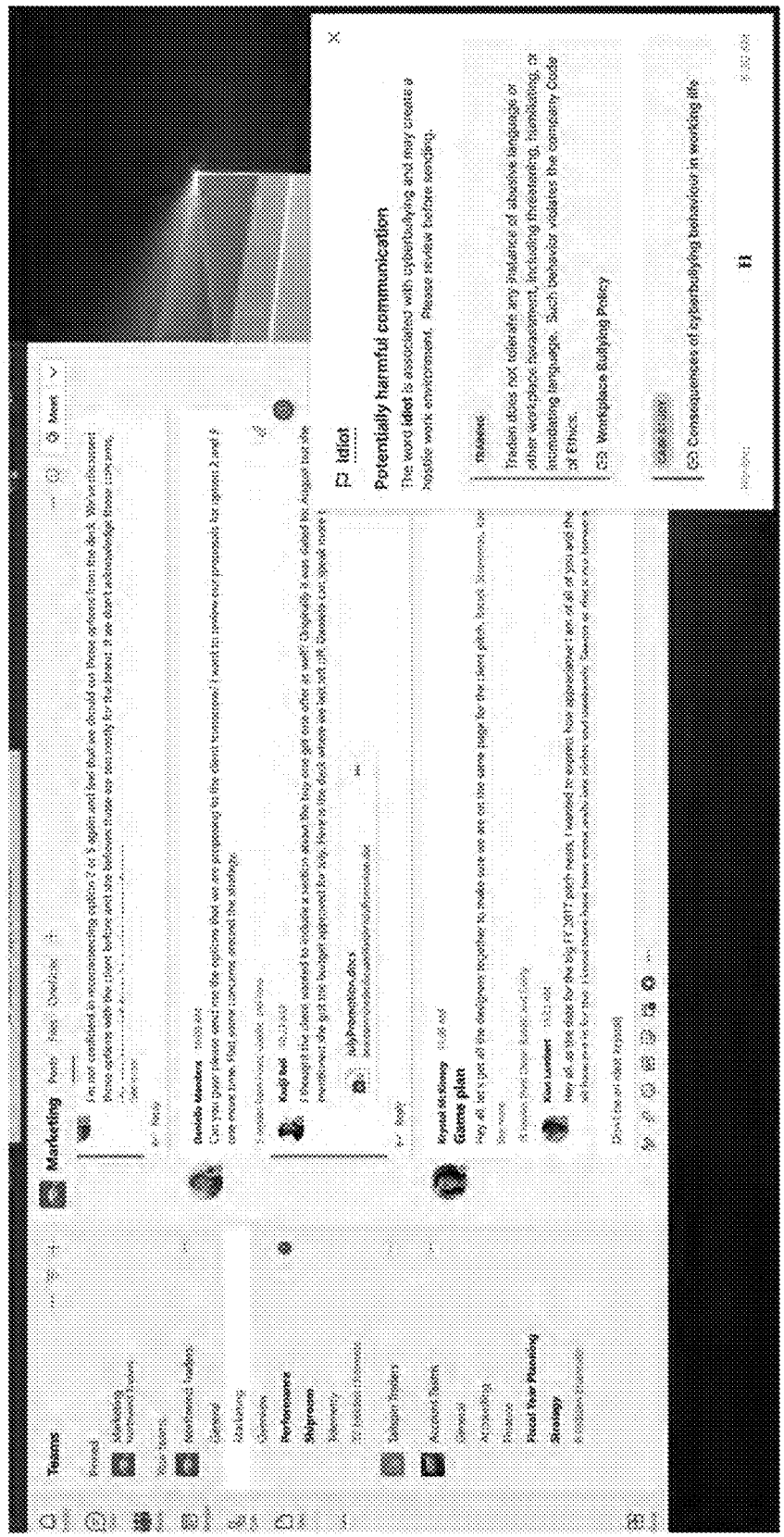
FIG. 7A shows an exemplary screenshot of a digital message analysis result in a chat application, in accordance with an embodiment.
Figure 7B:
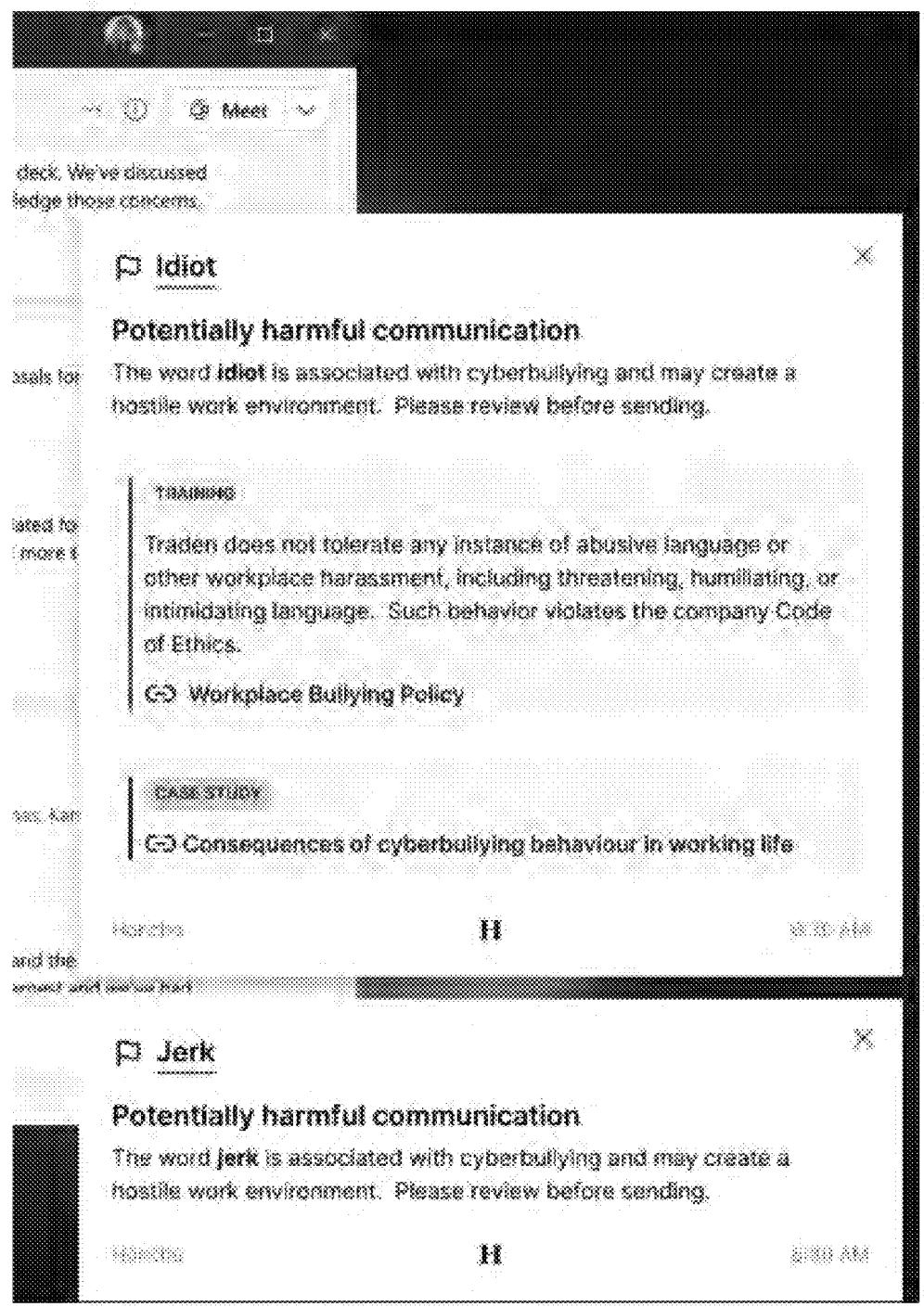
FIG. 7B shows another exemplary screenshot of a digital message analysis result in the chat application, in accordance with an embodiment.
Figure 7C:
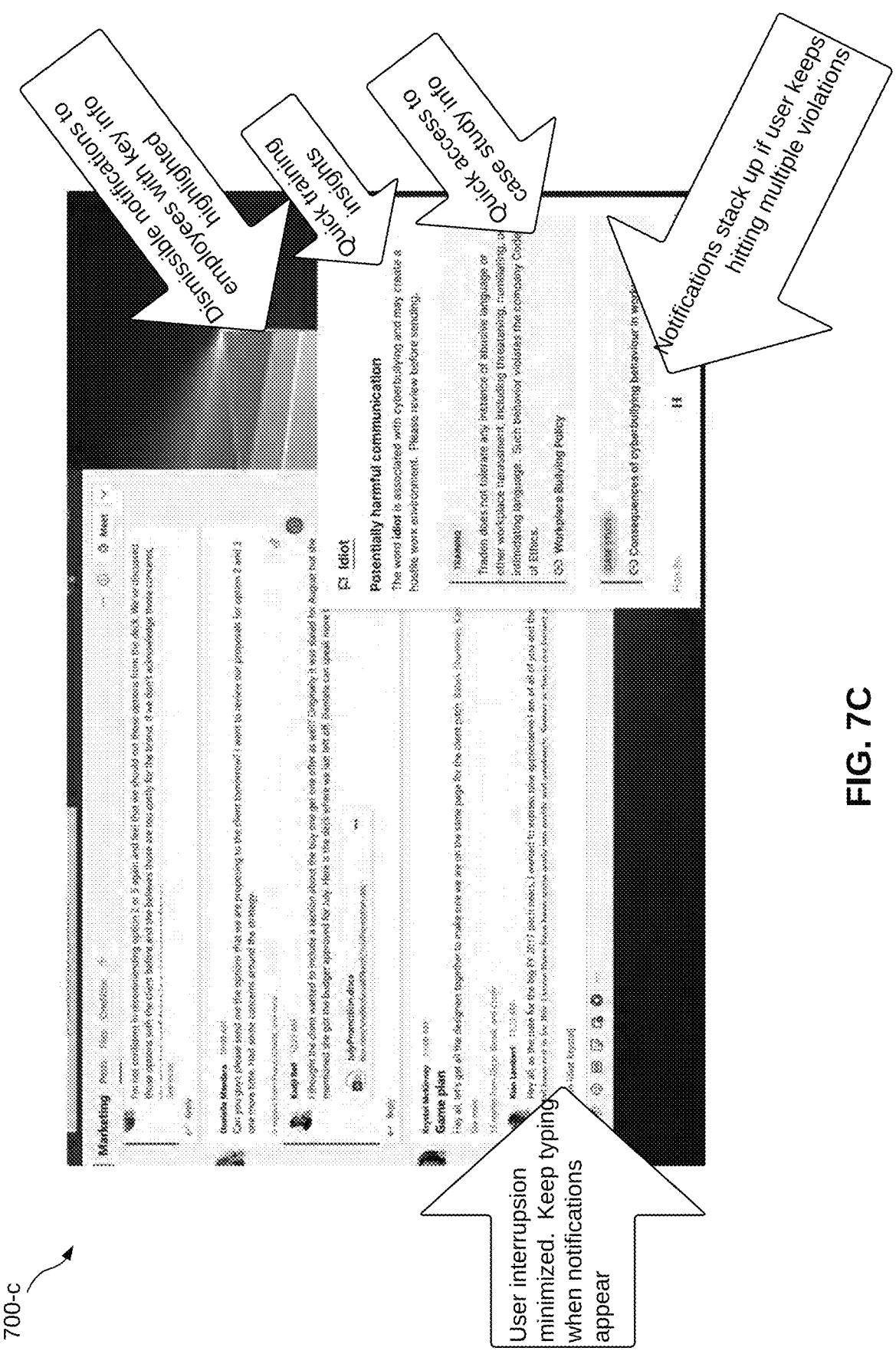
FIG. 7C shows still another exemplary screenshot of a digital message analysis result in the chat application, annotated with explanatory details, in accordance with an embodiment.

Notification module 126 may be configured to display a notification on the computing device (e.g., user device from which the sentence or phrase was received), wherein the notification comprises an indication that the sentence or phrase is non-compliant, further described in relation to FIGS. 7A-C.

Lemmatization module 128 may be configured to determine, for each word in the list of words for a concept flag part, a respective lemma. Further, lemmatization module 128 may be configured to create a lemma list for each concept flag part, the lemma list comprising the respective lemmas of the list of words for the concept flag part. In some embodiments, lemmatization module 128 may also determine, for each word of the sentence or phrase, a respective lemma.

Exceptions module 130 may be configured to receive one or more exceptions for the concept flag, wherein the one or more exceptions comprise one or more inflections of lemmas (e.g., "settings" or "setup" for the lemma "set") and jargon words. In some cases, receiving the one or more exceptions may further include receiving one or more special case rules for the inflections of lemmas, one or more special case rules for the jargon words, or a combination thereof.

Token lemma filter module 132 may be configured to receive one or more token lemma filters. In some examples, the one or more relation patterns for the concept flag comprises the one or more token lemma filters, where the one or more token lemma filters are associated with one or more links or relations between lemmas of words or word alternatives of different concept flag parts.

In some examples, the matching module 120 may be configured to compare one or more edges in one or more sub-graphs of the dependency graph to the one or more token lemma filters. The matching module 120 may be configured to rule match one or more combinations of nodes in the sentence or phrase to the one or more token lemma filters, where each node comprises a word of the sentence or phrase. The rule matching may comprise one or more of determining, for at least one node or a lemma of a node, that at least one outgoing edge matches at least one of the token lemma filters; determining, for at least one node or a lemma of a node, that at least one incoming edge matches at least one of the token lemma filters; and determining, in the one or more sub-graphs, that one or more edges satisfy the one or more token lemma filters, wherein each of the one or more edges comprises a link or relation between two nodes or two lemmas of nodes. The matching module 120 may work in conjunction with one or more of the token lemma filter module 132 and the dependency parse graph module 118 to perform the rule matching. Further details of rule matching process are described in relation to FIGS. 5A-5K.

Scoring module 134 may be configured to assign one or more scores to the one or more combinations of nodes in the sentence or phrase based on the results of the rule matching process. Further, scoring module 134 may compare a sum of the one or more scores to a block threshold value to determine if the sentence or phrase should be blocked, or alternatively, flagged. The blocking module 124 may be configured to block the sentence or phrase based on the sum being at or above the block threshold value, where the blocking comprises precluding the at least the portion of the keystroke data signal from reaching the target application in the application layer. Alternatively, if the sum is lower than the block threshold value, notification module 126 may be configured to flag the sentence or phrase, where the flagging may include displaying the notification on the user device.

In some embodiments, scoring module 134 may also be configured to assign scores based on assessing positive and negative sentiments in communications. As previously described, scoring may be performed on an individual level and/or a company level. These scores may be fed to a scoring analytics dashboard and may be used to assess, for instance, an overall health score for a company as compared to its peers, a score for an individual as compared to other employees at the company, etc. As can be appreciated, the scoring for an individual may be compared to all other employees at the company, employees in the same sub-division or group (e.g., finance, marketing, accounting, etc.), employees having the same designation or seniority level at the organization, to name a few non-limiting examples. Further, individual or company scores may be aggregated over time and compared to other time periods to assess how certain events (e.g., restructuring, layoffs, mergers, acquisitions, etc. on a company level; promotion, raise or bonus, etc., on an individual level) have shaped the overall sentiment of the individual or the company. In some cases, sentiment or health scoring may facilitate in gaining a deeper understanding of the culture and communications health of an organization, which may offer current and prospective employees, investors, and/or the general public useful insight into the company and its standing related to company communications along multiple dimensions that include Diversity, Equity, and Inclusion (DEI), employee experience, and professionalism.

In some implementations, server(s) 102, client computing platform(s) 104, and/or external resources 138 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which server(s) 102, client computing platform(s) 104, and/or external resources 138 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a netbook, a smartphone, a gaming console, and/or other computing platforms.

External resources 138 may include sources of information outside of system 100, external entities participating with system 100, and/or other resources. In some implementations, some or all of the functionality attributed herein to external resources 138 may be provided by resources included in system 100.

Server(s) 102 may include electronic storage 140, one or more processors 142, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 140 may comprise non-transitory storage media that electronically stores information. The electronic storage media of electronic storage 140 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 140 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 140 may include one or more virtual storage resources (e.g., cloud storage, a virtual private network, and/or other virtual storage resources). Electronic storage 140 may store software algorithms, information determined by processor(s) 142, information received from server(s) 102, information received from client computing platform(s) 104, and/or other information that enables server(s) 102 to function as described herein.

For example, while various modules discussed above, such as concept flag module 108, concept flag parts module 110, relation patterns module 112, lemmatization module 128, exceptions module 130, and token lemma filter module 132, are described as being configured to receive various information thereto, it is noted that the information received at these modules may be provided from an external source, such as one or more external resources 138 affiliated with a particular user group or corporate client. Alternatively, the information received at these modules may be present within server(s) 102 as internal libraries that may be selected depending on the specific user group or corporate client accessing the system. In some cases, the functionality of server(s) 102 may be provided as a software-as-a-service (SaaS), capable of being remotely accessed by a variety of users in different user groups or corporate clients. In certain embodiments, the information to be provided to the various modules may be configurable by information technology (IT) personnel at the various user groups or corporate clients for specific contexts, or preset by the manager of server(s) 102.

Processor(s) 142 may be configured to provide information processing capabilities in server(s) 102. As such, processor(s) 142 may include one or more of a digital processor, an analog processor, a digital circuit designed to process information, an analog circuit designed to process information, a state machine, and/or other mechanisms for electronically processing information. Although processor(s) 142 is shown in FIG. 1 as a single entity, this is for illustrative purposes only. In some implementations, processor(s) 142 may include a plurality of processing units. These processing units may be physically located within the same device, or processor(s) 142 may represent processing functionality of a plurality of devices operating in coordination. Processor(s) 142 may be configured to execute modules 108, 110, 112, 114, 116, 118, 120, 122, 124, 126, 128, 130, 132, 134, and/or 136, and/or other modules. Processor(s) 142 may be configured to execute modules 108, 110, 112, 114, 116, 118, 120, 122, 124, 126, 128, 130, 132, 134, and/or 136, and/or other modules by software; hardware; firmware; some combination of software, hardware, and/or firmware; and/or other mechanisms for configuring processing capabilities on processor(s) 142. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, 130, 132, 134, and/or 136 are illustrated in FIG. 1 as being implemented within a single processing unit, in implementations in which processor(s) 142 includes multiple processing units, one or more of modules 108, 110, 112, 114, 116, 118, 120, 122, 124, 126, 128, 130, 132, 134, and/or 136 may be implemented remotely from the other modules. The description of the functionality provided by the different modules 108, 110, 112, 114, 116, 118, 120, 122, 124, 126, 128, 130, 132, 134, and/or 136 described below is for illustrative purposes, and is not intended to be limiting, as any of modules 108, 110, 112, 114, 116, 118, 120, 122, 124, 126, 128, 130, 132, 134, and/or 136 may provide more or less functionality than is described. For example, one or more of modules 108, 110, 112, 114, 116, 118, 120, 122, 124, 126, 128, 130, 132, 134, and/or 136 may be eliminated, and some or all of its functionality may be provided by other ones of modules 108, 110, 112, 114, 116, 118, 120, 122, 124, 126, 128, 130, 132, 134, and/or 136. As another example, processor(s) 142 may be configured to execute one or more additional modules that may perform some or all of the functionality attributed below to one of modules 108, 110, 112, 114, 116, 118, 120, 122, 124, 126, 128, 130, 132, 134, and/or 136.

Figure 2:
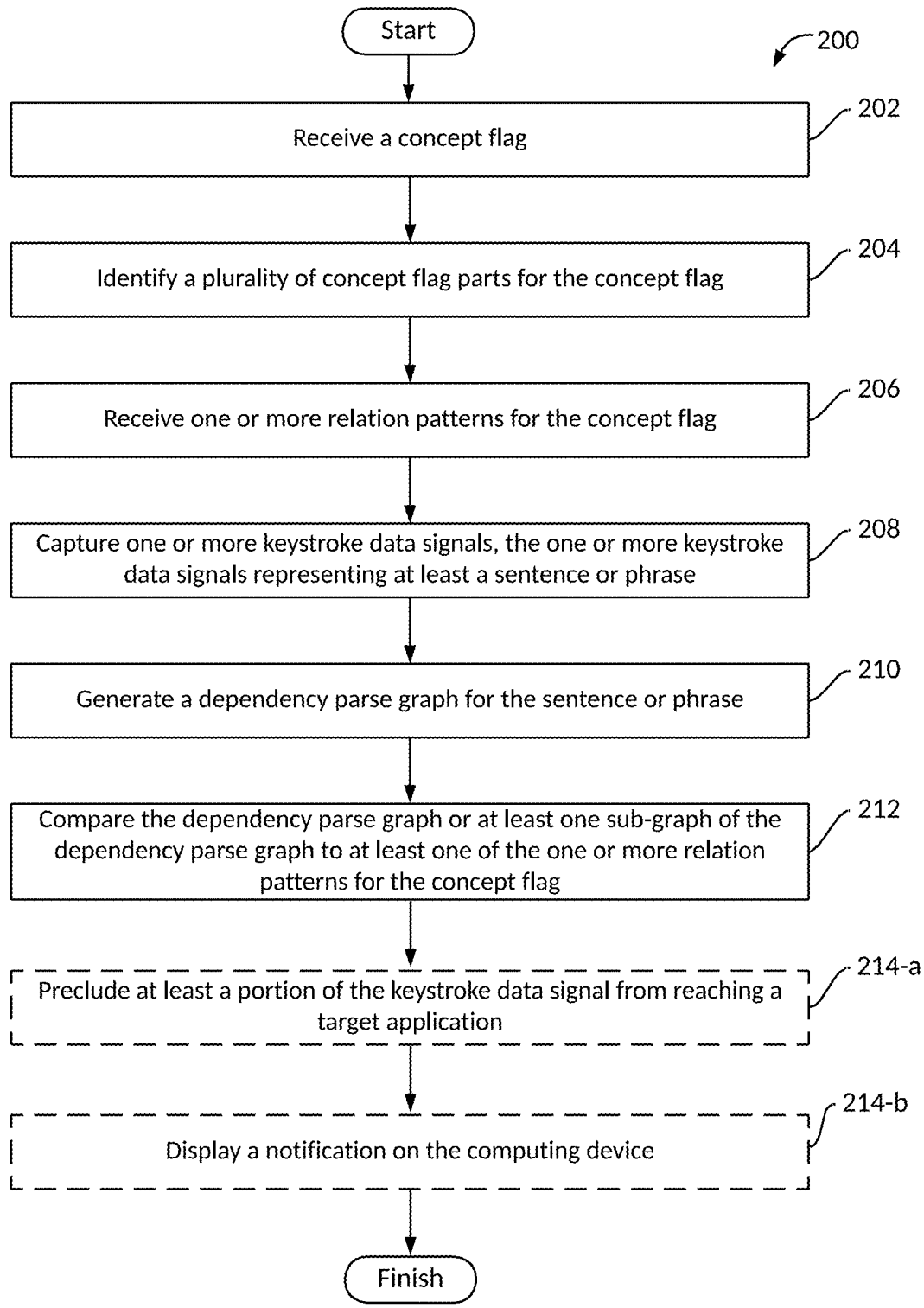
FIG. 2 shows a method for preventing compliance-violating messages, in accordance with an embodiment.

FIG. 2 shows a method for preventing compliance-violating messages, in accordance with an embodiment. In particular, FIG. 2 illustrates a method 200 of preventing corporate- and legal compliance-violating messages by analyzing keystrokes associated with messages via operations occurring between hardware and application layers of a computing device, in accordance with one or more implementations. The operations of method 200 presented below are intended to be illustrative. In some implementations, methods 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving a concept flag, wherein the concept flag is associated with a non-compliant expression or idea. Operation 202 may be performed by one or more hardware processors configured by machine-readable instructions including a module that is the same as or similar to concept flag module 108, in accordance with one or more implementations.

An operation 204 may include identifying a plurality of concept flag parts for the concept flag. Operation 204 may be performed by one or more hardware processors configured by machine-readable instructions including a module that is the same as or similar to concept flag parts module 110, in accordance with one or more implementations.

An operation 206 may include receiving one or more relation patterns for the concept flag, wherein each of the one or more relation patterns includes a direct or indirect association between a portion of the plurality of concept flag parts. Operation 206 may be performed by one or more hardware processors configured by machine-readable instructions including a module that is the same as or similar to relation patterns module 112, in accordance with one or more implementations.

An operation 208 may include capturing one or more keystroke data signals from a text input hardware device of the computing device, the one or more keystroke data signals representing at least a sentence or phrase. Operation 208 may be performed by one or more hardware processors configured by machine-readable instructions including one or more modules that are the same as or similar to user input module 114 and/or parsing module 116, in accordance with one or more implementations.

In some embodiments, method 200 may further comprise determining, at an end of each sentence or phrase, if the sentence or phrase is non-compliant. For instance, an operation 210 may include generating a dependency parse graph for the sentence or phrase, the dependency parse graph comprising a graph of relations between two or more words in the sentence or phrase. Operation 210 may be performed by one or more hardware processors configured by machine-readable instructions including a module that is the same as or similar to dependency parse graph module 118, in accordance with one or more implementations.

An operation 212 may include comparing the dependency parse graph or at least one sub-graph of the dependency parse graph to at least one of the one or more relation patterns for the concept flag. Operation 212 may be performed by one or more hardware processors configured by machine-readable instructions including a module that is the same as or similar to matching module 120, in accordance with one or more implementations.

In some embodiments, if the dependency parse graph or the at least one sub-graph matches the at least one of the one or more relation patterns, method 200 may comprise deeming the sentence or phrase non-compliant. In some examples, the operation for deeming the sentence or phrase non-compliant may be performed by one or more hardware processors configured by machine-readable instructions including a module that is the same as or similar to compliance module 122, in accordance with one or more implementations.

After the sentence or phrase is deemed non-compliant, the method 200 may comprise at least one of optional operations 214-a and 214-b (shown as optional by the dashed lines).

Optional operation 214-a may include, at a layer between a hardware and an application layer, precluding at least a portion of the keystroke data signal from reaching a target application in the application layer. Operation 214-a may be performed by one or more hardware processors configured by machine-readable instructions including a module that is the same as or similar to blocking module 124, in accordance with one or more implementations. In some embodiments, the operation 214-a may prevent a message, or even portions of a message, from being saved to non-volatile or volatile memory.

Optional operation 214-b may comprise displaying a notification on the computing device, wherein the notification comprises an indication that the sentence or phrase is non-compliant. Operation 214-b may be performed by one or more hardware processors configured by machine-readable instructions including a module that is the same as or similar to notification module 126, in accordance with one or more implementations.

Figure 3A:
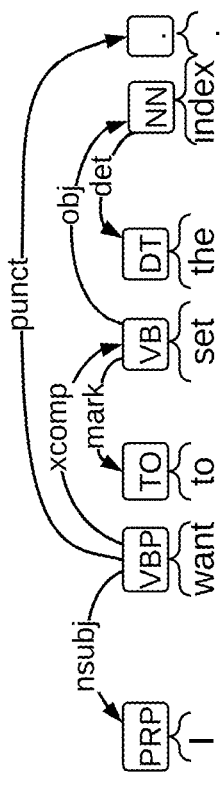
FIG. 3A shows a sentence dependency graph for a first exemplary sentence, in accordance with an embodiment.
Figure 3B:
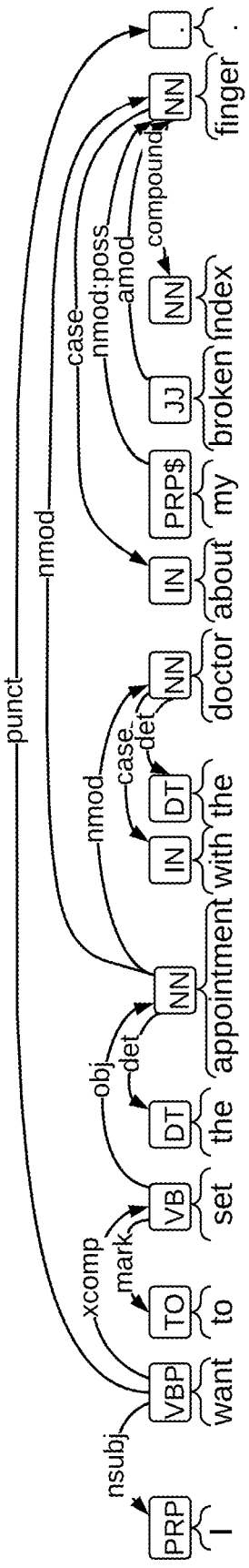
FIG. 3B shows a sentence dependency graph for a second exemplary sentence, in accordance with an embodiment.
Figure 3C:
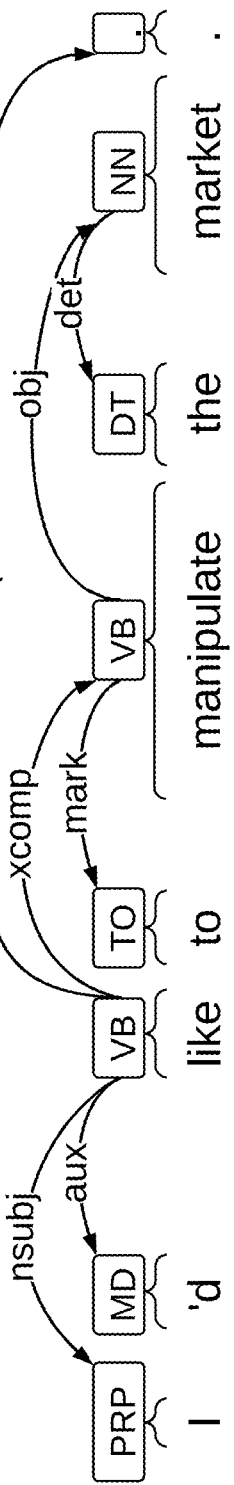
FIG. 3C shows a sentence dependency graph for a third exemplary sentence, in accordance with an embodiment.

FIGS. 3A-3C illustrate shows examples of sentence dependency graphs for three exemplary sentences, in accordance with embodiments.

In particular, FIGS. 3A and 3B illustrate example sentence dependency graphs 300-a and 300-b, respectively, for the sentences "I want to set the index" and "I want to set the appointment with the doctor about my broken index finger." In some cases, aspects of the present disclosure may relate to generating a sentence dependency graph (also referred to as a dependency graph, or alternatively, a dependency tree) to identify relations between lemmas, which may enable the system to distinguish between sentences having the same or similar lemmas. For instance, by identifying the relation between lemmas, the system may be able to label the sentence "I want to set the index" as problematic (e.g., since it relates to market manipulation), but not "I want to set the appointment with the doctor about my broken index finger." In some cases, the system of the present disclosure may utilize a sentence dependency parser, where the dependency parser receives a sentence or phrase as an input and builds a dependency graph or tree. The dependency graph or tree may comprise one or more nodes, where each node is the word or token of a sentence. Further, nodes of a dependency graph or tree may be connected by edges (e.g., a first edge may connect a first and a second node, a second edge may connect the second node and a third node, and a third edge may connect a fourth and a fifth node, etc.), where each of the labeled edges of the graph or tree represents a relation between two words. In some cases, there is a set of possible relations two nodes/words can be in.

As seen, in both sentences, the word "want" is a root. A root (or root node) may refer to a node with no incoming edges. Further, in FIG. 3A, the word "index" is a direct object of a word "set," which is designated by the "obj" arrow. Additionally, in the second sentence in FIG. 3B, the word "appointment" is a direct object of "set," "finger" is a nominal modifier of "appointment," and "index" is a part of a compound multi-word expression with "finger." Using this analysis, the match criteria for the concept flag may be generalized as set->object->index (i.e., "index" should be a direct object of the word "set" for a match).

The system 100 may allow an administrator to configure one or more match criteria for the concept flag, for instance, based on use case. For example, an administrator in the health sciences industry may wish to utilize different match criteria than an administrator in the finance industry. In some embodiments, the system 100 may also suggest a plurality of match criteria based on analyzing the concept flag received from the client.

Returning to the example above, a match or relation pattern for the concept flag "set the index" may be represented as:

Action=set|change|push|manipulate–First concept flag part
Object=index|market|price–Second concept flag part
{any lemma from Action}--obj-->{any lemma from Object}-Combination of parts, the relation or matching pattern to be identified Turning now to FIG. 3C, which illustrates an example of a sentence dependency graph 300-c for the sentence "I'd like to manipulate the market." As seen, the dependency graph is largely similar to the one in FIG. 3A, where the word "market" is a direct object of the word "manipulate." Using the above match or relation pattern, the system may deem the sentences in FIGS. 3A and 3C as problematic, but not the one in FIG. 3B.

There are various online tools available to generate the sentence dependency graphs seen in FIGS. 3A-3C, including, but not limited to, STANFORD CoreNLP (http://corenlp.run/) or spaCy (https://explosion.ai/demos/displacy?text=I%20want%20to%20set%20the%20index.%20I%20want%20to%20set%20the%20appointment%20with%20the%20doctor%20about%20my%20broken%20index%20finger.&model=en_core_web_sm&cpu=1&cph=0). Other tools known in the art may be utilized in different embodiments, and the examples listed above are not intended to be limiting.

Figure 4:
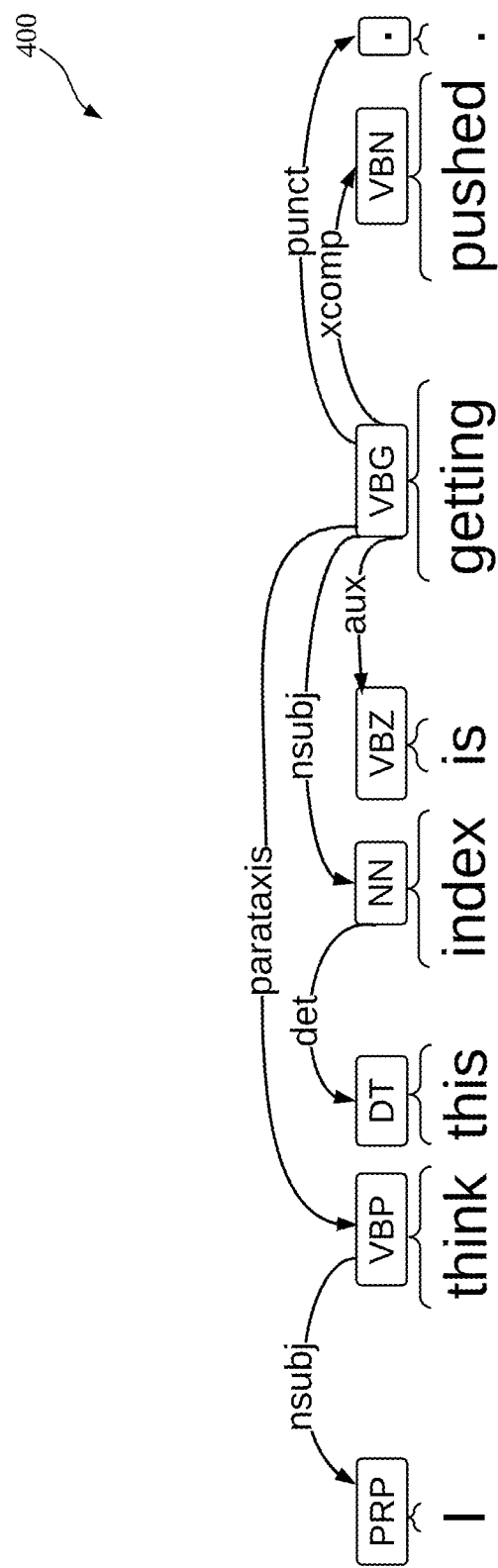
FIG. 4 shows a sentence dependency graph for a fourth exemplary sentence, in accordance with an embodiment.

FIG. 4 shows a sentence dependency graph for a fourth exemplary sentence, in accordance with an embodiment. In particular, FIG. 4 illustrates an example of a sentence dependency graph 400 for the sentence "I think this index is getting pushed." A client may indicate that this sentence should also be detected/matched since it may relate to improper or illegal trading. As seen, the sentence dependency graph 400 in FIG. 4 is different from the ones previously described in relation to FIGS. 3A and 3C. For instance, the word "index" is not a direct object of "pushed," where the word "pushed" can be lemmatized to "push." Instead, in this example, the relation between "index" and "pushed" may be denoted as: "Action<--xcomp--*--nsubj-->Object," where Action refers to the first concept flag part (e.g., set, change, push, manipulate) and Object refers to the second concept flag part (e.g., index, market, price). Thus, there can be more than one relation or matching pattern per concept flag. Further, in some circumstances, concept flag parts may not be directly connected to each other in a dependency parse tree or graph.

The original matching or relation pattern from FIGS. 3A-C may now be updated to:
Action=set|change|push|manipulate
Object=index|market|price
Patterns=[{lemma(Action)}--obj-->{lemma(Object)}]
OR
. . . possibly other patterns . . . OR
[{lemma(Action)}<--xcomp--*--nsubj-->{lemma(Object)}]

In some examples, sentence dependency parsing may enable the creation or generation of a graph of relations between words in a sentence or phrase. Further, a concept flag may only get matched when its parts satisfy a particular pattern in the sentence dependency graph. It should be noted that, a concept flag may be linked or associated with multiple dependency patterns (also referred to as relation or matching patterns). Said another way, the relation pattern in the sentence dependency graph may be compared to the one or more dependency patterns for the concept flag, and if at least one of the dependency patterns for the concept flag matches the relation pattern in the sentence dependency graph, a match may be identified.

FIG. 5A shows several sentences to be analyzed by the system of the present disclosure, in accordance with an embodiment. In particular, FIG. 5A illustrates text 500-*a* for which one or more dependency parse graphs were generated, in accordance with one or more implementations. As seen, text 500-*a* comprises four separate sentences, of which the first three are potentially problematic since they may relate to improper or illegal trading. FIG. 5A also includes the annotations (e.g., dependency parse, lemmas) used to generate the parse graphs.

FIG. 5B shows the results of a lemmatization analysis of the sentences in FIG. 5A, in accordance with an embodiment. Particularly, FIG. 5B illustrates lemmatizations 500-*b* of the sentences in FIG. 5A, according to an embodiment of the disclosure. As seen, the first sentence "I'm thinking about setting the indices" may be lemmatized to "I be think about set the index."

Figure 5C:
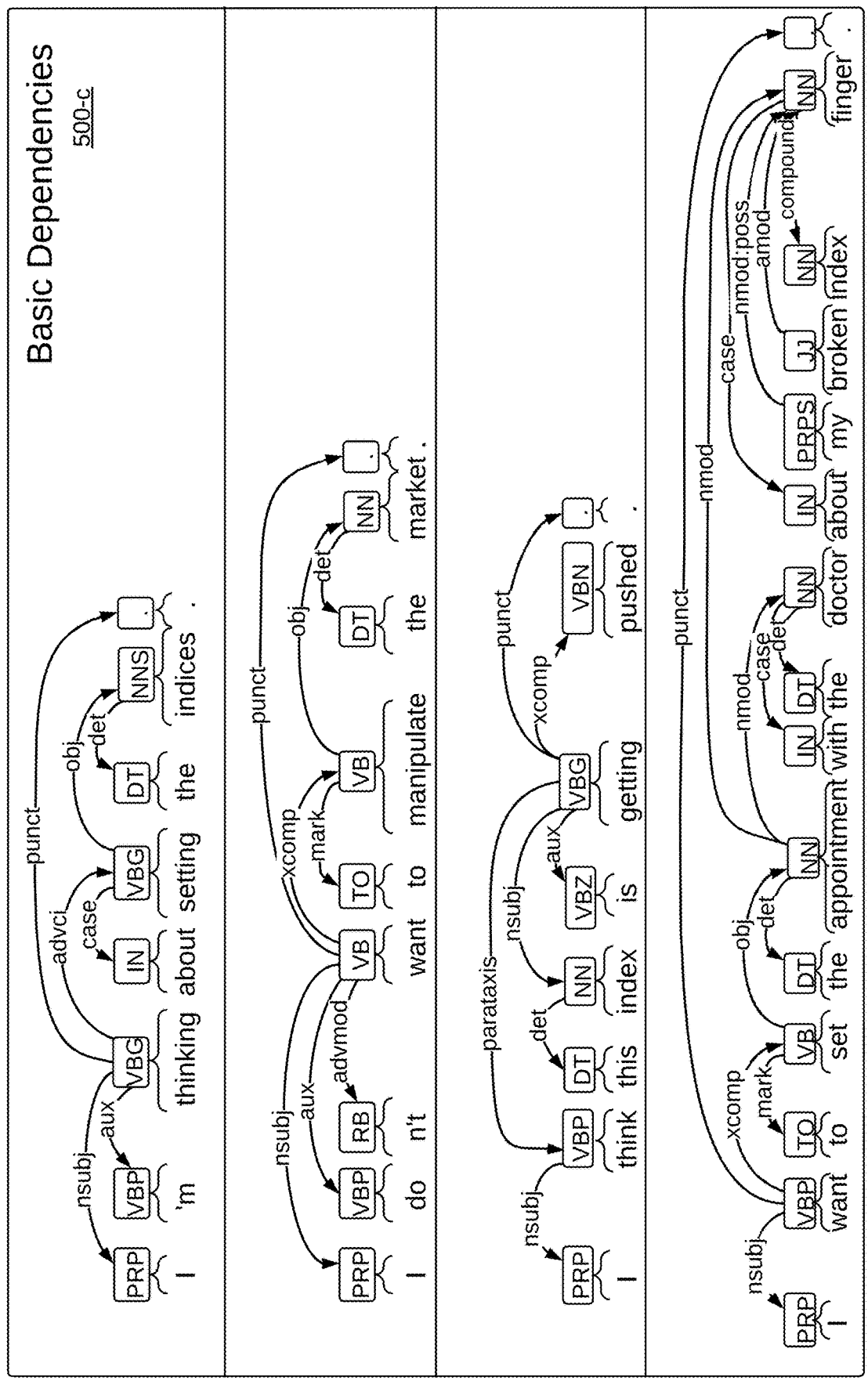
FIG. 5C shows sentence dependency graphs for the sentences in FIG. 5A, in accordance with an embodiment.
Figure 5D:
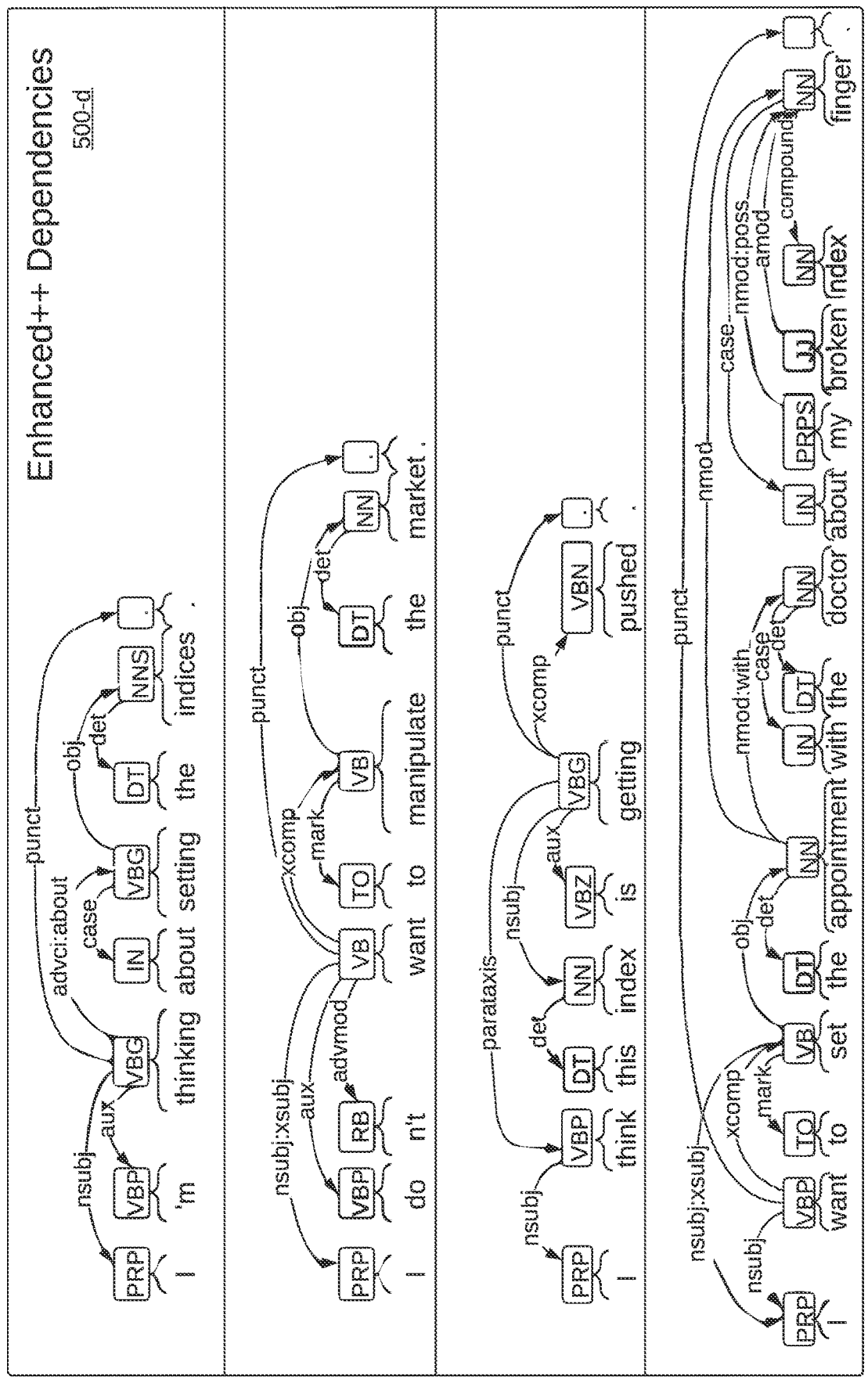
FIG. 5D shows enhanced sentence dependency graphs for the sentences in FIG. 5A, in accordance with an embodiment.

FIG. 5C shows sentence dependency graphs for the sentences in FIG. 5A, and FIG. 5D shows enhanced sentence dependency graphs for the sentences in FIG. 5A, in accordance with an embodiment. More particularly, FIGS. 5C and 5D show dependency graphs 500-*c* and 500-*d*, respectively, of the sentences in FIG. 5A, in accordance with one or more implementations. While the examples shown in FIGS. 5A-5D were created using CoreNLP, it should be noted that any other Natural Language Processing (NLP) tool adapted to lemmatize sentences or phrases and/or generate sentence dependency graphs may be utilized in different embodiments. In some other cases, the system of the present disclosure may be configured to lemmatize and/or generate a dependency graph for an input sentence.

Figures 5E, 5F:
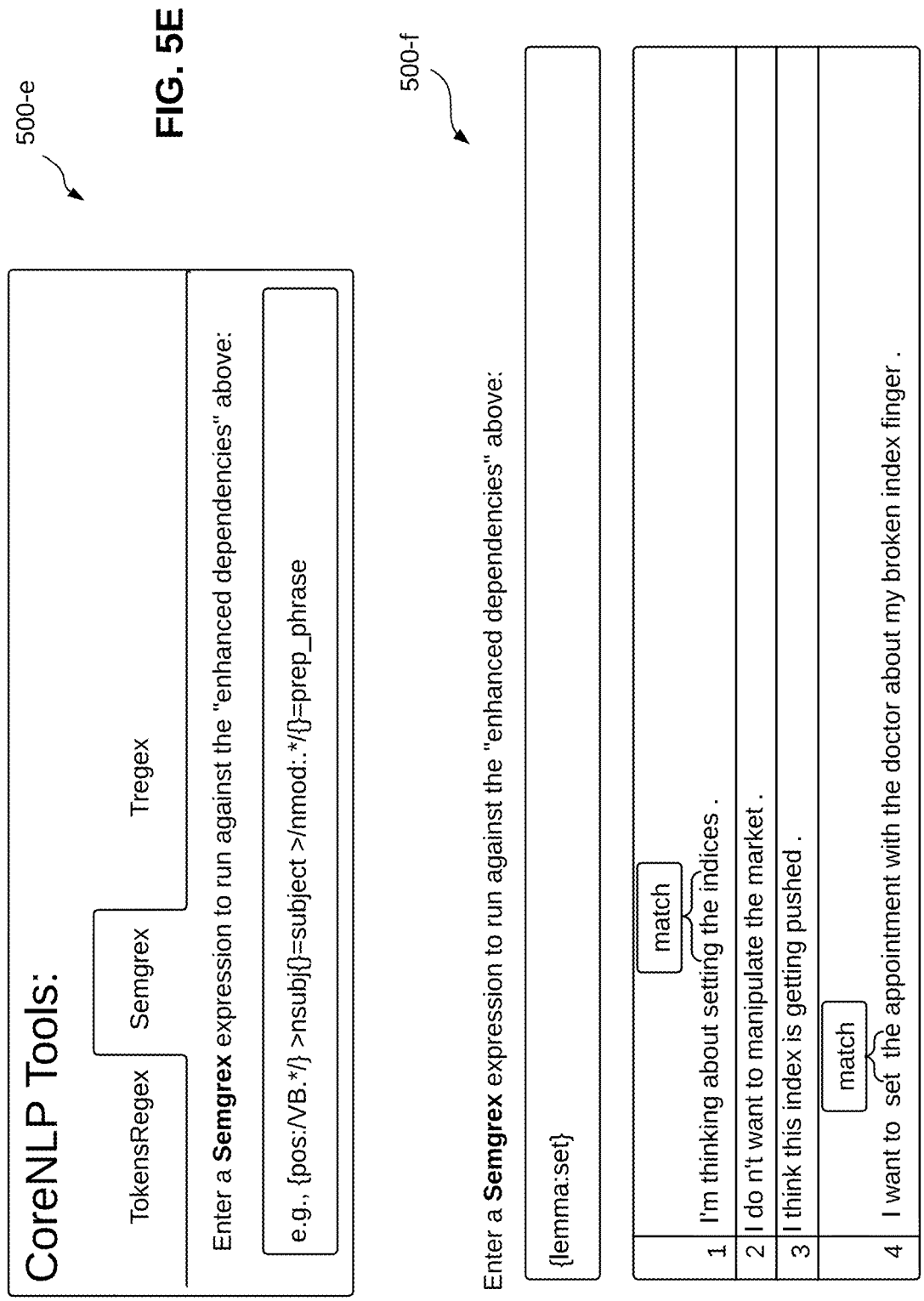
FIG. 5E shows an exemplary user interface (UI) form, in accordance with an embodiment.
FIG. 5F shows an exemplary analysis output, in accordance with an embodiment.

FIG. 5E shows an exemplary user interface (UI) form, in accordance with an embodiment. Particularly, FIG. 5E illustrates an example of a UI 500-*e* that may be used to indicate a Semgrex expression to run against one or more dependency graphs, in accordance with one or more implementations. In some cases, Semgrex may refer to a utility for matching patterns in dependency graphs (or trees) based on graph relationships and regular expression matches on nodes. In other words, Semgrex may enable the system to match nodes and edges in a dependency graph.

FIG. 5F shows an exemplary analysis output, in accordance with an embodiment. Particularly, FIG. 5F illustrates one example of a Semgrex expression 500-*f* that may be run against the dependency graphs in FIG. 5D, in accordance with one or more implementations. In this example, the Semgrex expression (also referred to as Semgrex pattern) is {lemma:set}. Any token or word with the lemma "set" may be matched using this Semgrex pattern. As seen, the first and fourth sentences having the word "set" are now matched based on this pattern.

FIG. 5G shows another exemplary analysis output, in accordance with an embodiment. Particularly, FIG. 5G illustrates another example of a Semgrex expression 500-*g* (i.e., {lemma:set|manipulate/}) that may be run against the dependency graphs in 5D. In this example, the NLP tool matches any token (or word) that has either the "set" or "manipulate" lemma.

FIG. 5H shows still another exemplary analysis output, in accordance with an embodiment. In FIG. 5H, the token match condition has a placeholder label. For instance, FIG. 5H illustrates a Semgrex expression 500-*h*, where the Semgrex expression is {lemma:set|manipulate/}=SomeLabelHere. This placeholder label (i.e., 'SomeLabelHere') may be replaced by another term, for instance, "Action" or "Object," as described in the following figures.

Figure 5I:
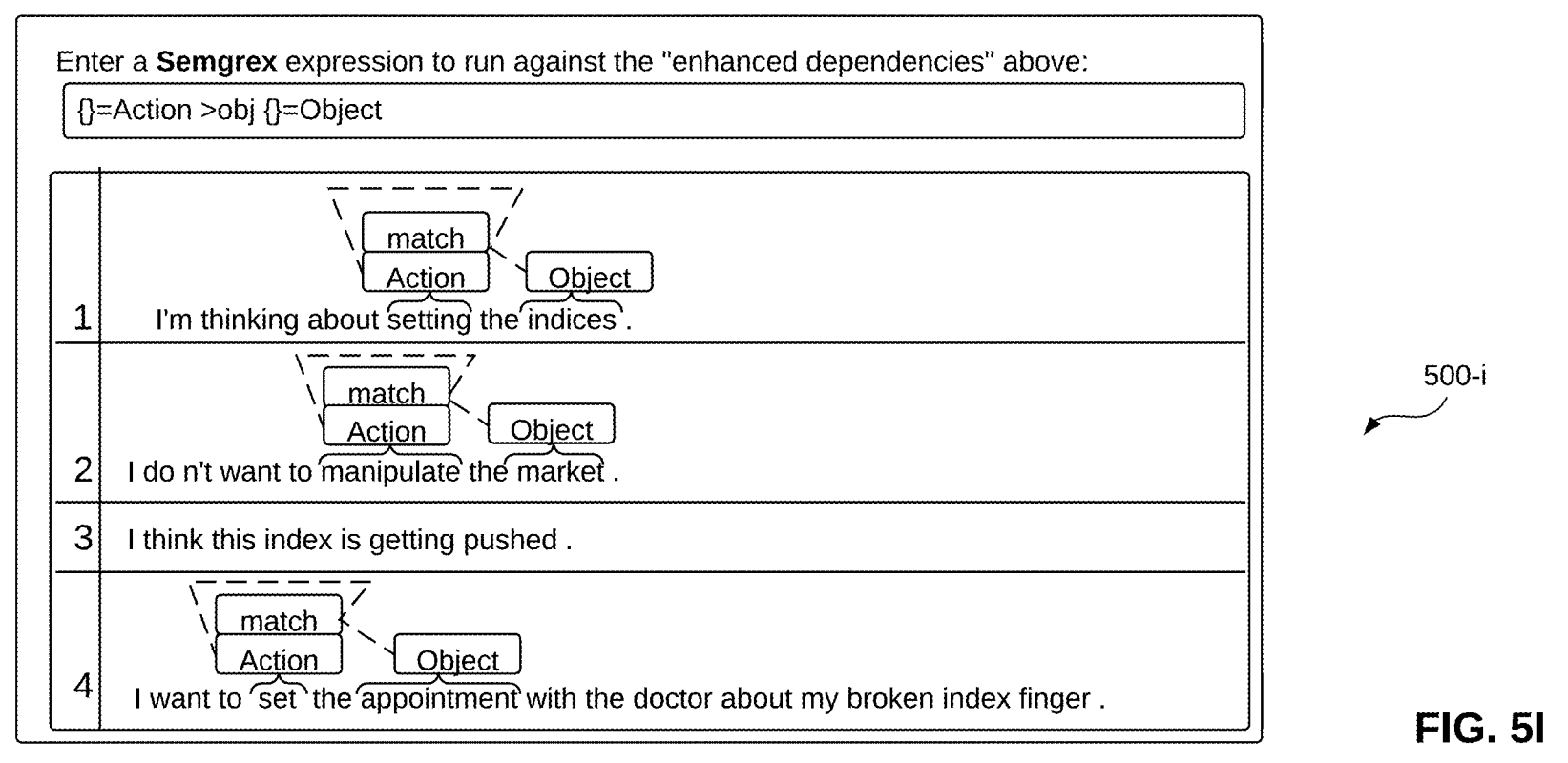

FIG. 5I shows a dependency parse graph and yet another exemplary analysis output, in accordance with an embodiment. Particularly, in FIG. 5I, a Semgrex expression 500-*i* (also referred to as Semgrex pattern, a matching pattern, a dependency pattern, or a relation pattern) is used to compare the one or more relations/edges in the dependency graph to one or more token lemma filters. In the example shown, the Semgrex expression/pattern ({ }=Action>obj { }=Object) may be used to find any two nodes that are connected by the "object" or "obj" relation. In some cases, the { } may refer to any token or word.

Figure 5J:
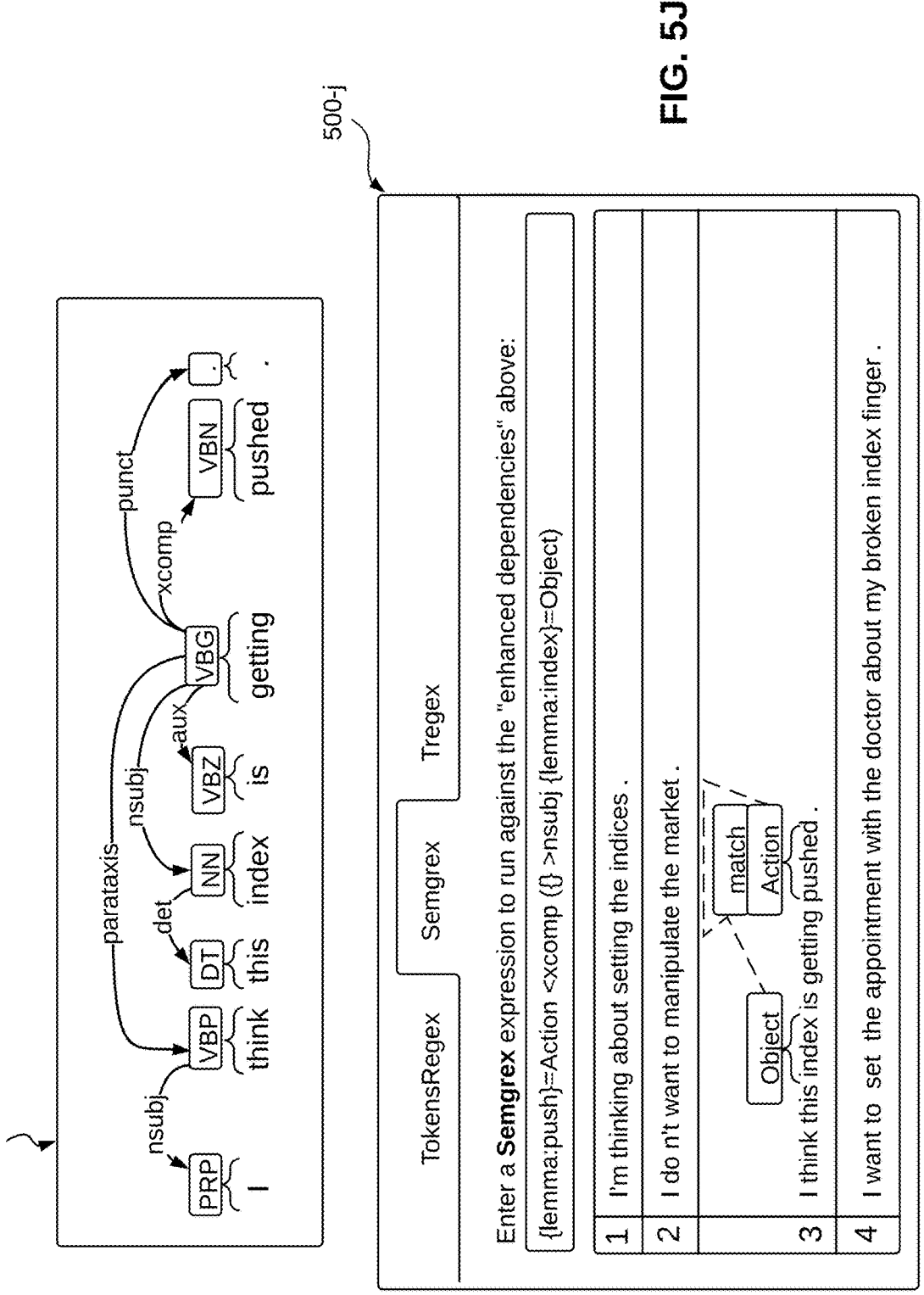
FIG. 5J shows a further exemplary analysis output, in accordance with an embodiment.

FIG. 5J shows a further exemplary analysis output, in accordance with an embodiment. The Semgrex expression or pattern ({lemma:/set|manipulate|push}=Action>obj {lemma:/index|market/}=Object) in FIG. 5J may be used to match any phrase having a direct object relation between a token (or lemma of a token) from the "Action" concept flag part list to a token (or lemma of a token) from the "Object" concept flag part list. For instance, the "Action" concept flag part list comprises lemmas "set," "change," "push" and "manipulate," while the "Object" concept flag part list comprises lemmas "index," "market," and "price." While the dependency or matching pattern (i.e., requiring a direct object relation between "Action" concept flag parts and "Object" concept flag parts") in FIG. 5J correctly identifies sentences 1 and 2 as being problematic, it fails to match sentence 3. As used herein, the concept flag part lists containing the lemmas may also be referred to as a lemma list.

As seen in FIG. 5J, the third sentence has a different dependency graph than the first and second sentences. Namely, in sentence 3, there is no "direct object" relation between the lemma "push" in the "Action" concept flag parts list and the lemma "index" in the "Object" concept flag parts list. In this example, another Semgrex expression or pattern may be utilized to specifically capture such a sentence or phrase. For instance, the Semgrex pattern: { }>xcomp {lemma:push}=Action>nsubj {lemma:index}=Object, may be utilized. Using this dependency/match pattern, the system may search for any node having two outgoing edges, where one edge is an "xcom" to the lemma "push," while the other is an "nsubj" to the lemma "index."

FIG. 5K shows another exemplary analysis output, in accordance with an embodiment. The Semgrex pattern may also be represented using brackets, for instance: {lemma:

push}=Action<xcomp ({ }>nsubj {lemma:index}=Object), as shown in FIG. 5K. In this case, the Semgrex pattern or expression may be read as: search for any lemma "push" token that has an incoming "xcomp" edge from a node, where the node may be matched by the following sub-expression—any node having an outgoing "nsubj" edge to the lemma "index" token. In either case, the node "getting" in the sentence has an "nsubj" edge to the lemma "index" and an "xcomp" edge to the lemma "push."

In some cases, there may be more than one hop between concept flag parts. In such cases, readability of the Semgrex patterns/expressions may be enhanced by stacking the bracketed sub-expressions while constructing the Semgrex. The following is an example of a pseudocode for detecting violation (e.g., when a concept flag 'set the index' is matched) based on the example sentences described in relation to FIGS. 5A-5K:

Action=set|change|push|manipulate
Object=index|market|price
Patterns=[{lemma:/Action/}>obj {lemma:/Object/}] OR
  . . . possibly other patterns . . . OR
  [{lemma:/Action/}<xcomp ({ }>nsubj {lemma:/Object/})]

In some cases, the system of the present disclosure may run each context flag's dependency/matching patterns on the input sentences to determine if any of the patterns match. In some cases, the system of the present disclosure may utilize one or more tools or libraries to match sub-graphs in dependency graphs. These tools or libraries provide a language to express rules for the matching. Said another way, these tools/libraries may allow the client to describe the kind of relations they are looking for between certain words or tokens.

Due to the keyboard configuration, compact form factor, etc., IMs sent from smart phones and tablets are more prone to typos and misspellings. In some embodiments, the system of the present disclosure may be configured to not only detect typos and/or misspellings in IMs, but also fix them and/or detect potential violations. For instance, after parsing the IM, the system may check if there is a possibility for a misspelled word to be fixed to one of the words in the concept flag. If so, the system may run a dependency parse (i.e., generate a dependency graph) using the fixed spelling and attempt to match the relation pattern in the dependency graph to the one or more match or relation patterns for the concept flag. It should be noted that, the system may also run a dependency parse and attempt to match using the original spelling (e.g., misspelling). In some examples, the system may run the misspelled word against a list of common spellings (e.g., absence may be misspelled as "absense," or "abcence"; indict as "indite"; harass as "harrass," to name a few non-limiting examples). Additionally or alternatively, the system may also count the number of letters/alphabets it needs to change in order to fix each misspelled word.

In some cases, the system may also allow a user (e.g., an administrator) to configure specific word forms that they do not want to match. For example, if the concept flag is "set the index," the system may search for any lemma of "set." Some lemmatization tools may lemmatize the noun "settings" (i.e., meaning "preferences") or "setup" as "set'. In such cases, the user may configure the system to match the lemma "set," but not when the exact inflection is "settings" or "setup." Additionally, the system may also allow a user to configure specific combination(s) of words. For instance, a user may add an exclusion for a particular combination of words that they do not wish to flag. In the example, if "set" and "push" are listed as "Actions" and "index" and "market" as "Objects," and any of their combinations are problematic except for "push the market," the user or administrator may add an exclusion for that specific combination.

FIGS. 6A and 6B show portions of exemplary code for configuring a concept flag, in accordance with certain embodiments. Particularly, FIGS. 6A and 6B show example codes 600-a and 600-b, respectively, used to configure a concept flag, in accordance with one or more implementations. Code 600-a is a JSON representation and code 600-b is a CSV representation of the concept flag described in relation to FIGS. 5A-5K. It should be noted that JSON and CSV are merely two example formats that may be used to configure concept flags in the system 100 and are not intended to be limiting. Other coding languages and/or formats known in the art may be utilized to configure concept flags in different embodiments.

FIGS. 7A-7C show exemplary screenshots of digital message analysis results in a chat application, in accordance with certain embodiments. In particular, FIG. 7A illustrates an example of a UI 700-a for digital message analysis, in accordance with one or more implementations. As described above, in some embodiments, the system of the present disclosure may be configured to analyze digital messages (e.g., IMs in Microsoft Teams) in real-time, detect inconsistencies with enterprise policies or procedures, regulations, etc., and display notifications to warn and/or educate the user. For example, the system (e.g., system 100 in FIG. 1) may notify an individual typing a message and make them aware that their word(s) or phrase selection may be inconsistent with company policies and request them to modify what they wrote. In other cases, the system may block a message from being sent based on determining that a word or phrase in the message is inconsistent with policies or procedures. The UI 700-a depicts an IM window (center) and a popup window (lower right corner), where the popup window includes an indication that the word "idiot" in the IM window may be construed as a potentially harmful communication. The popup window also includes additional information to educate the user that the word "idiot" is "associated with cyberbullying and may create a hostile work environment." In the example shown, the popup window generated by the system (e.g., system 100) also includes a snippet of the workplace bullying policy at the company and a link to a case study on cyberbullying behavior in working life. Other types of information may be displayed via the popup window in different embodiments.

FIG. 7B illustrates a detailed view of the popup window in FIG. 7A, in accordance with one or more implementations.

FIG. 7C provides additional details regarding the interaction between users and the system, in accordance with one or more implementations. As seen, in some embodiments, the system may allow a user to dismiss the popup notifications displayed on their user device, which may serve to minimize user interruption. In some examples, the user may continue typing even when notifications appear on their screen. Further, the system may highlight key information (e.g., in bold, a larger font, or through any other means) in the notifications, provide training insights, provide access to relevant case study information (if any), to name a few non-limiting examples. In some cases, the popup notifications may continue to stack up on the user's screen if the user keeps hitting multiple violations. While not necessary, in some embodiments, the system may prevent the user from typing or proceeding if the number of violations dismissed by the user exceeds a threshold, and/or if the number of violations in a predefined period (e.g., 1 day, 1 week, etc.)

exceeds a threshold, to name two non-limiting examples. In other instances, the user may be able to dismiss certain popup notifications, but if a message surpasses a threshold for risk, then the popup may not be dismissed (in other words, some popups can be dismissed while others cannot).

Figure 8:
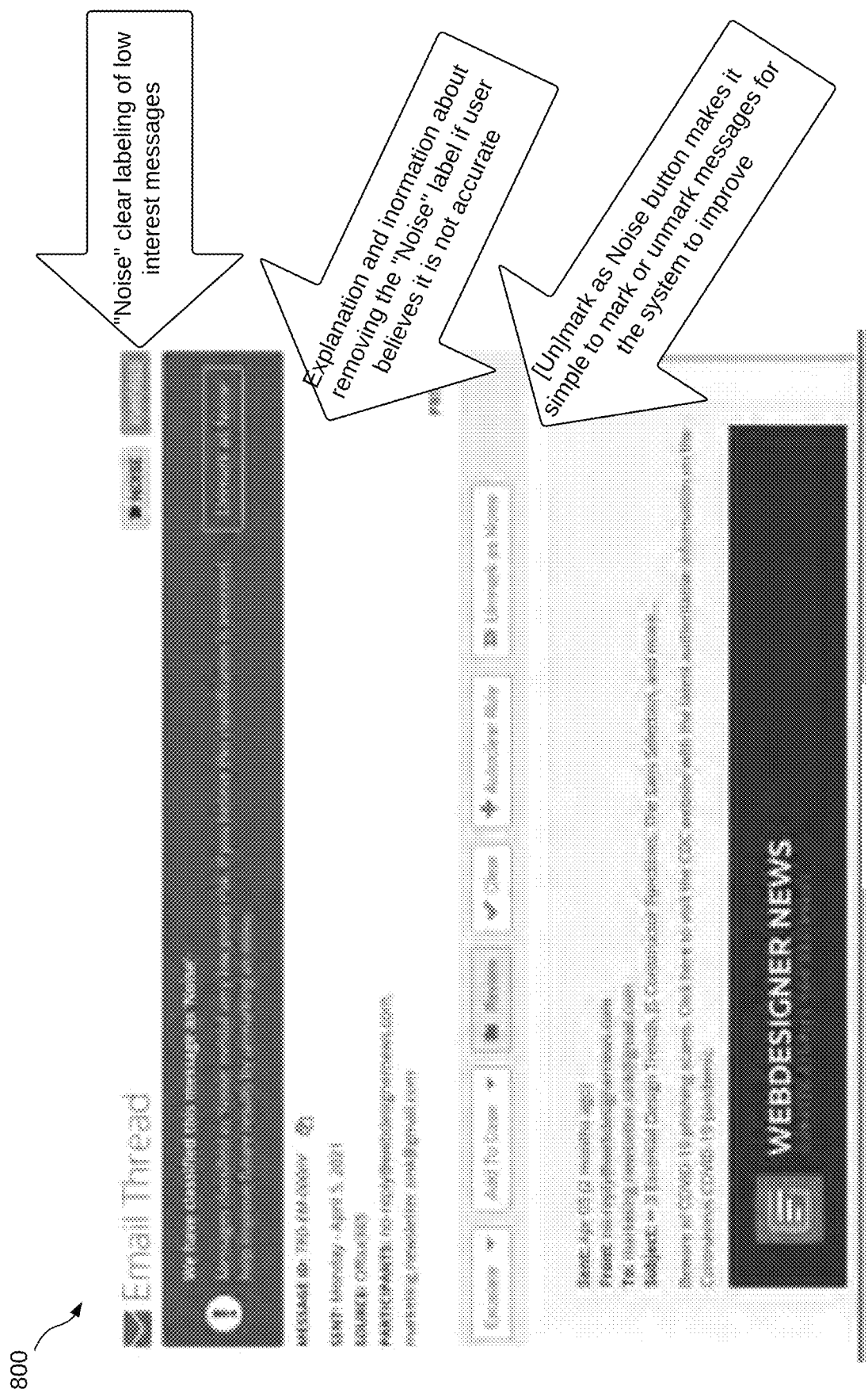
FIG. 8 shows an exemplary screenshot of a digital message analysis result in an email application, annotated with explanatory details, in accordance with an embodiment.

FIG. 8 shows an exemplary screenshot of a digital message analysis result in an email application, annotated with explanatory details, in accordance with an embodiment. Particularly, FIG. 8 illustrates an example of a UI 800 directed to noise cancellation feedback for digital message analysis, according to an embodiment of the disclosure. In some cases, the system may analyze and assess messages arriving at a user's email inbox and classify them based on an estimated policy risk. In the example shown, the system has classified the email message as 'Noise' based on assessing that the message exhibits very low policy risk (i.e., a low interest message). In some non-limiting examples, the system also displays an explanation and/or information for removing the 'Noise' label if the user believes that it is inaccurate. A user may click on the 'unmark as noise' button displayed in the UI 800 to update the label assigned by the system. The system may use this information provided by the user and feed it into a training model to improve labeling accuracy in the future, for instance.

Figure 9A:
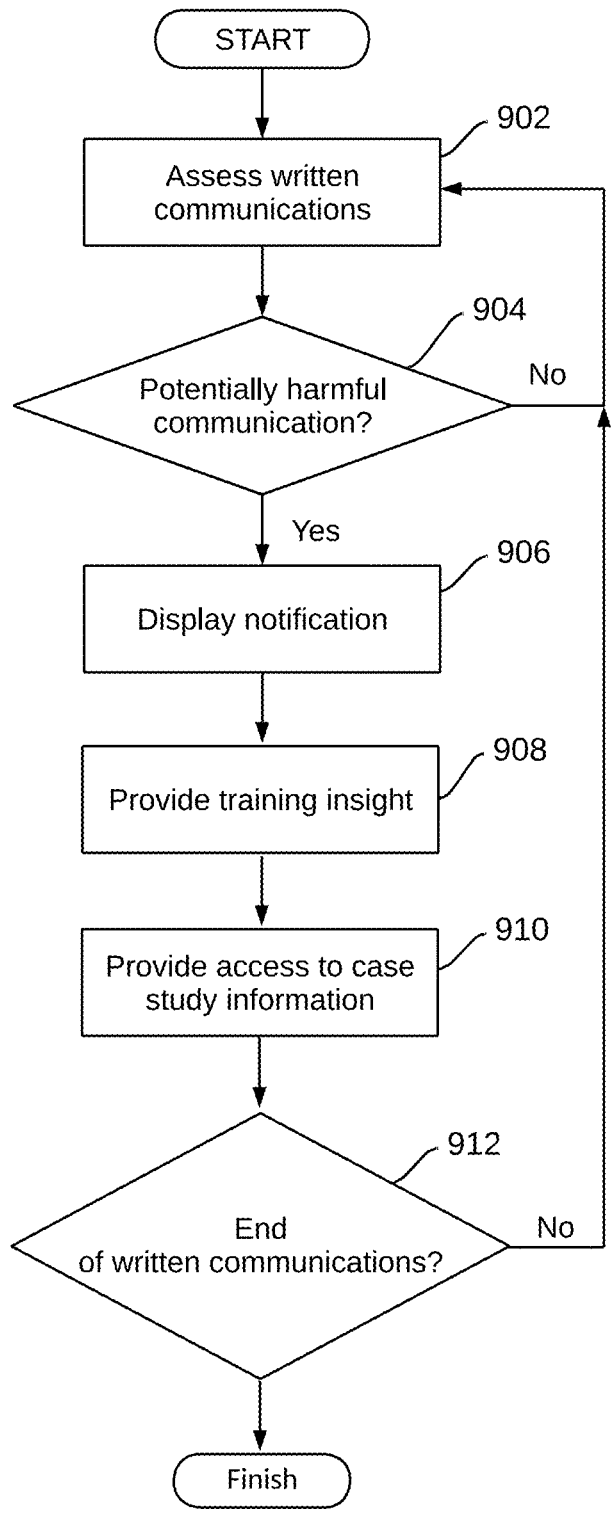
FIG. 9A shows an exemplary flowchart, illustrating a method for training and educating users, in accordance with an embodiment.
Figure 9B:
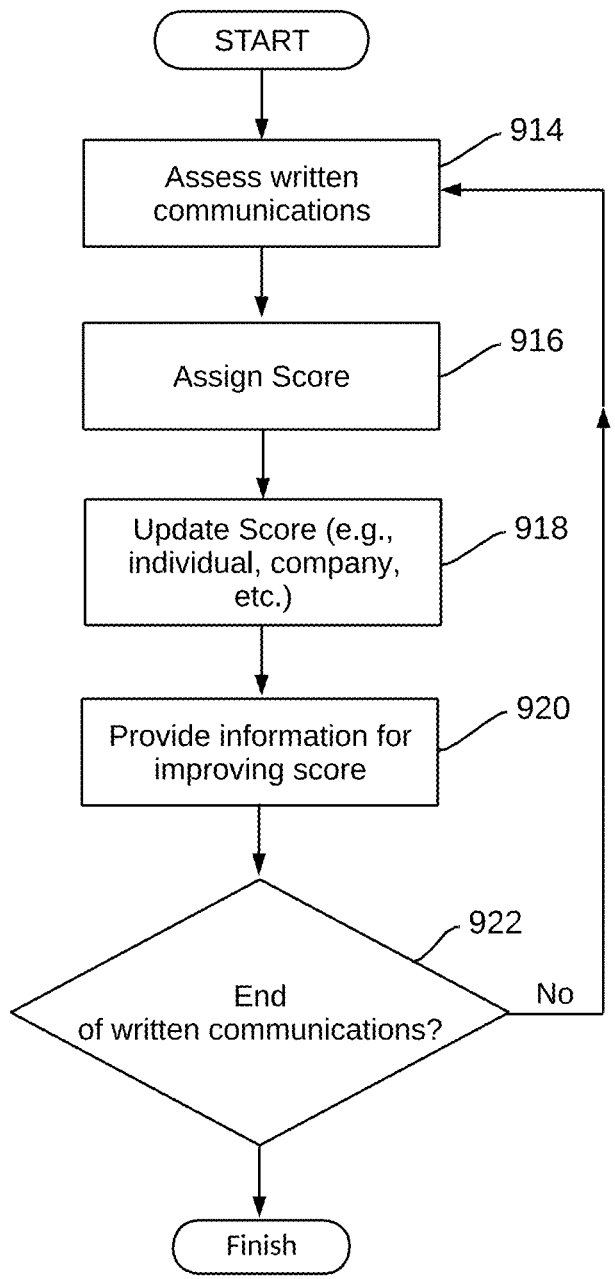
FIG. 9B shows an exemplary flow chart, illustrating a method for scoring communications, in accordance with an embodiment.

FIGS. 9A and 9B show exemplary flowcharts, illustrating a method for training and educating users and a method for scoring communications, in accordance with certain embodiments. More particularly, FIG. 9A illustrates an example of a flowchart 900-a of a method for training and educating users, in accordance with one or more implementations. In some cases, the system (e.g., system 100 in FIG. 1) of the present disclosure may evaluate digital messages (shown as assess written communications in Block 902) in real-time against positive and negative sentiments. Negative sentiments that are evaluated may prompt the system to warn, educate, and notify (e.g., via a popup window, or through other applicable means) the individual typing them so the individual can be informed that their word or phrase selection is inconsistent with company policies and/or procedures. For instance, if the system identifies a potentially harmful communication at Decision 904, the system proceeds to display a notification (Block 906), provide training insight (Block 908), and/or provide access to case study information (Block 910), as previously described in relation to FIGS. 7A-C. The system may continue assessing the written communications for negative sentiments until it identifies that the written communications have ended (Decision 912).

FIG. 9B illustrates an example of a flowchart 900-b of a method for scoring communications, in accordance with one or more implementations. In some cases, the system may assign a score to sentiments (i.e., both positive and negative sentiments) associated with internal and/or external communications at a company, which may serve as a useful measure of how the company promotes Diversity, Equity, and Inclusion (DEI), for instance. It should be noted that the methods related to sentiment or communications scoring and/or compliance described in this disclosure may be used to evaluate a company on other fronts besides DEI, such as, but not limited to, anti-discrimination, anti-harassment, sexual harassment, anti-bullying, integrity (e.g., conflicts of interest/gifts), anti-bribery and corruption, anti-money laundering, ITAR compliance, etc., to name a few non-limiting examples. In some embodiments, the system may maintain a score for individual users or employees of a company, an overall company score, and/or a score for companies in a particular industry or field (e.g., finance, automotive, manufacturing, medical devices, etc.), to name a few non-limiting examples. In some cases, the system may also provide an analytics score dashboard (e.g., an interactive UI) that may enable companies to compare their overall health score to their peers. In some aspects, the score (also referred to as a health score) serves as a representation of the communications and/or cultural health of an organization. In some cases, current and prospective employees, investors, clients, and/or the general public may utilize the health score to evaluate a company and its standing related to company communications along multiple dimensions that include DE&I, employee experience, sentiment, and professionalism, to name a few non-limiting examples.

At Block 914, the method comprises assessing communications (e.g., written or typed communications) across one or more applications. In some embodiments, the system also provides feedback and coaching based on the assessing. For instance, a user engaged in typing a message, such as an email or IM, on a computing device may be provided feedback when his/her message is potentially problematic.

At Block 916, the method comprises assigning a score to the sentiment, the message, the individual or user writing the message, or a combination thereof.

At Block 918, the method comprises updating at least one score (e.g., a health score for the company, a score for the individual, etc.). For instance, the system may add or decrement scores based on additional positive or negative sentiments arriving at the company health score. The health score may be numerical, or alternatively, on a grade.

At Block 920, the system may provide additional information for improving the score, such as, but not limited to, training insight on why a certain word or phrase in the message was problematic, a link to the company's policies or procedures, and case study information (e.g., related to cyberbullying), to name three non-limiting examples. In some cases, the system may also provide real-time feedback to help improve the company's overall score, as well as information pertaining to the user's individual contribution to the overall company score. For instance, the system may display information pertaining to a current company score and the potential drop in the company score if the problematic message were sent. Similarly, the system may display information related to a current score for the individual and the potential drop in their score if they sent the harmful communication.

The system may continue assessing the written communications for negative sentiments until it identifies an end of written communications at Decision 922.

In some embodiments, the system may aggregate messages for scoring dashboard reporting and analysis. Identifying and reporting the aggregate of flagged messages for later analysis, action, reporting, and scoring may be used by compliance officers or others to identify future training opportunities or arrive at an overall communications health score of the organization. For instance, the system may store a snapshot or a screenshot of the user's message (i.e., if problematic or potentially harmful) and provide them to an administrator, Human Resources (HR) employee, a manager, a compliance team member, or any other applicable entity, which may allow the entity to analyze employee interactions in context to ensure healthy and safe cultures are being maintained. In some cases, the system may or may not provide identifying information for the user to the entity.

The system may also analyze the collected data and create a score related to a specific set of words (or tokens) and/or phrases, which may help organizations understand what language is being used by their employees. This may serve to provide insight into whether or not employees are upholding an inclusive and safe workplace, or further promoting harassment and risk, for instance. Reporting at the individual word, sentence, and/or idea level may be aggregated, for instance, for reporting and scoring at the individual user level, groups of users level, or the company level. This aggregate score (e.g., aggregate individual score, aggregate group score, or aggregate company score) may be evaluated and assessed in comparison to other individuals at the company or between companies or between profile groups, to name a few non-limiting examples.

In some embodiments, the scores may be aggregated across a period of time, which may allow a company to assess how their overall health score has changed over time and/or assess their score relative to other companies. In some cases, compliance violations may be scored as a negative sentiment and positive words or phrase like "great job" or a manager writing "let's celebrate our team success" may create a positive sentiment score. The aggregate of sentiment scores, both negative and positive, may be used to create an overall company health score that can be continuously updated over time periods and assessed against the company's past score performance over another period. In some cases, this overall score may also be assessed against scores of other companies (e.g., companies in similar industries) or any other company demographic data slice.

Figure 10:
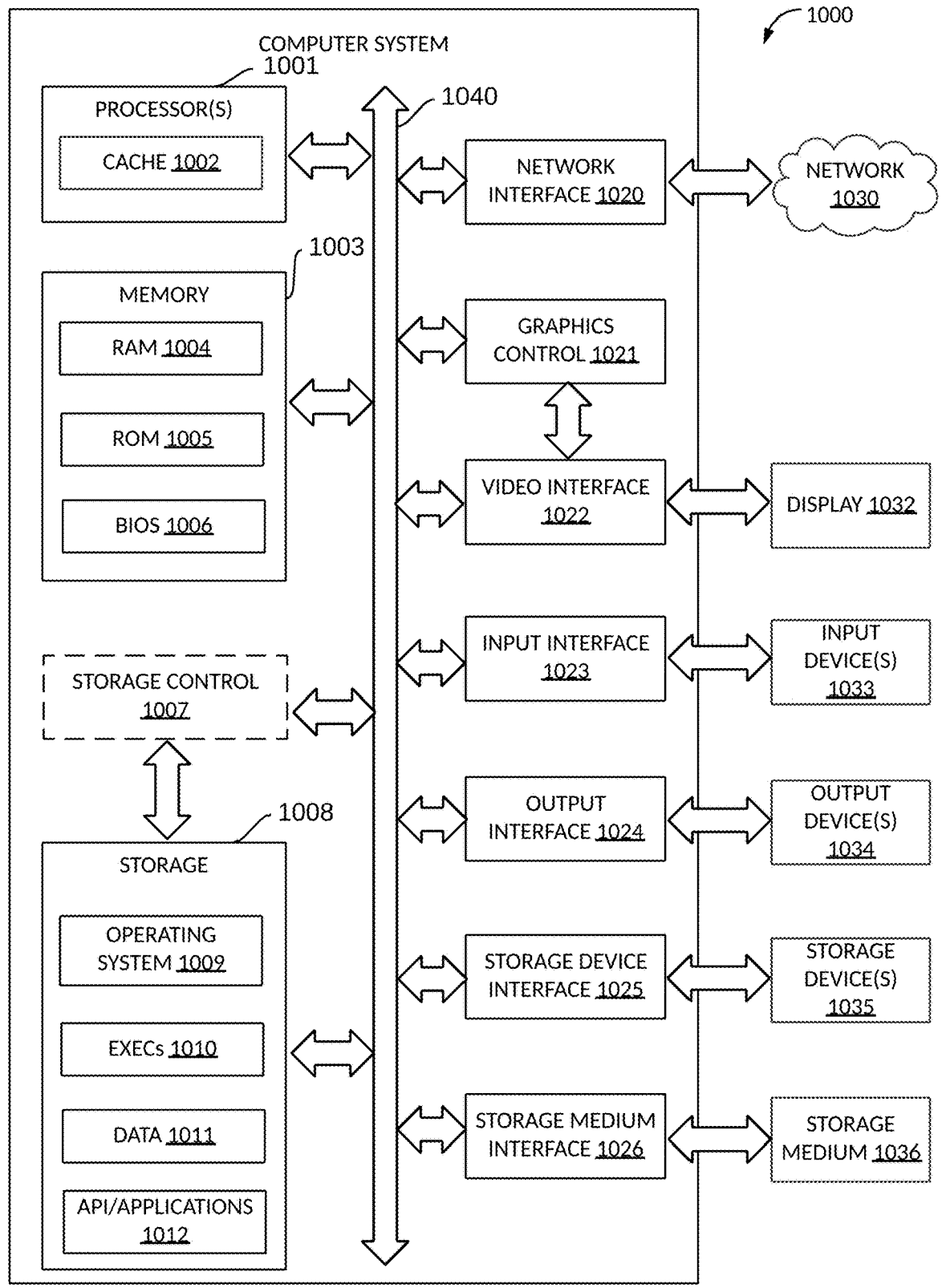
FIG. 10 illustrates a computer system for implementing aspects of the present disclosure, in accordance with an embodiment.

FIG. 10 illustrates a computer system for implementing aspects of the present disclosure, in accordance with an embodiment. Particularly, FIG. 10 illustrates a diagrammatic representation of one embodiment of a computer system 1000, within which a set of instructions can execute for causing a device to perform or execute any one or more of the aspects and/or methodologies of the present disclosure. The components in FIG. 10 are examples only and do not limit the scope of use or functionality of any hardware, software, firmware, embedded logic component, or a combination of two or more such components implementing particular embodiments of this disclosure. Some or all of the illustrated components can be part of the computer system 1000. For instance, the computer system 1000 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 1000 includes at least a processor 1001 such as a central processing unit (CPU) or a graphics processing unit (GPU) to name two non-limiting examples. Any of the subsystems described throughout this disclosure could embody the processor 1001. The computer system 1000 may also comprise a memory 1003 and a storage 1008, both communicating with each other, and with other components, via a bus 1040. The bus 1040 may also link a display 1032, one or more input devices 1033 (which may, for example, include a keypad, a keyboard, a mouse, a stylus, etc.), one or more output devices 1034, one or more storage devices 1035, and various non-transitory, tangible computer-readable storage media 1036 with each other and/or with one or more of the processor 1001, the memory 1003, and the storage 1008. All of these elements may interface directly or via one or more interfaces or adaptors to the bus 1040. For instance, the various non-transitory, tangible computer-readable storage media 1036 can interface with the bus 1040 via storage medium interface 1026. Computer system 1000 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1001 (or central processing unit(s) (CPU(s))) optionally contains a cache memory unit 1032 for temporary local storage of instructions, data, or computer addresses. Processor(s) 1001 are configured to assist in execution of computer-readable instructions stored on at least one non-transitory, tangible computer-readable storage medium. Computer system 1000 may provide functionality as a result of the processor(s) 1001 executing software embodied in one or more non-transitory, tangible computer-readable storage media, such as memory 1003, storage 1008, storage devices 1035, and/or storage medium 1036 (e.g., read only memory (ROM)). Memory 1003 may read the software from one or more other non-transitory, tangible computer-readable storage media (such as mass storage device(s) 1035, 1036) or from one or more other sources through a suitable interface, such as network interface 1020. Any of the subsystems herein disclosed could include a network interface such as the network interface 1020. The software may cause processor(s) 1001 to carry out one or more processes or one or more steps of one or more processes described or illustrated herein. Carrying out such processes or steps may include defining data structures stored in memory 1003 and modifying the data structures as directed by the software. In some embodiments, an FPGA can store instructions for carrying out functionality as described in this disclosure. In other embodiments, firmware includes instructions for carrying out functionality as described in this disclosure.

Memory 1003 may include various components (e.g., non-transitory, tangible computer-readable storage media) including, but not limited to, a random-access memory component (e.g., RAM 1004) (e.g., a static RAM "SRAM," a dynamic RAM "DRAM, etc.), a read-only component (e.g., ROM 10010), and any combinations thereof. ROM 10010 may act to communicate data and instructions unidirectionally to processor(s) 1001, and RAM 1004 may act to communicate data and instructions bidirectionally with processor(s) 1001. ROM 10010 and RAM 1004 may include any suitable non-transitory, tangible computer-readable storage media. In some instances, ROM 10010 and RAM 1004 include non-transitory, tangible computer-readable storage media for carrying out a method. In one example, a basic input/output system 1006 (BIOS), including basic routines that help to transfer information between elements within computer system 1000, such as during start-up, may be stored in the memory 1003.

Fixed storage 1008 is connected bi-directionally to processor(s) 1001, optionally through storage control unit 1007. Fixed storage 1008 provides additional data storage capacity and may also include any suitable non-transitory, tangible computer-readable media described herein. Storage 1008 may be used to store operating system 10010, EXECS 1010 (executables), data 1011, API applications 1012 (application programs), and the like. Often, although not always, storage 1008 is a secondary storage medium (such as a hard disk) that is slower than primary storage (e.g., memory 1003).

Storage 1008 can also include an optical disk drive, a solid-state memory device (e.g., flash-based systems), or a combination of any of the above. Information in storage 1008 may, in appropriate cases, be incorporated as virtual memory in memory 1003.

In one example, storage device(s) 1035 may be removably interfaced with computer system 1000 (e.g., via an external port connector (not shown)) via a storage device interface 1025. Particularly, storage device(s) 1035 and an associated machine-readable medium may provide nonvolatile and/or volatile storage of machine-readable instructions, data structures, program modules, and/or other data for the computer system 1000. In one example, software may reside, completely or partially, within a machine-readable medium on storage device(s) 1035. In another example, software may reside, completely or partially, within processor(s) 1001.

Bus 1040 connects a wide variety of subsystems. Herein, reference to a bus may encompass one or more digital signal lines serving a common function, where appropriate. Bus 1040 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1000 may also include an input device 1033. In one example, a user of computer system 1000 may enter commands and/or other information into computer system 1000 via input device(s) 1033. Examples of an input device(s) 1033 include, but are not limited to, an alpha-numeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 1033 may be interfaced to bus 1040 via any of a variety of input interfaces 1023 (e.g., input interface 1023) including, but not limited to, serial, parallel, game port, USB, FIREWIRE, THUNDERBOLT, or any combination of the above.

In particular embodiments, when computer system 1000 is connected to network 1030, computer system 1000 may communicate with other devices, such as mobile devices and enterprise systems, connected to network 1030. Communications to and from computer system 1000 may be sent through network interface 1020. For example, network interface 1020 may receive incoming communications (such as requests or responses from other devices) in the form of one or more packets (such as Internet Protocol (IP) packets) from network 1030, and computer system 1000 may store the incoming communications in memory 1003 for processing. Computer system 1000 may similarly store outgoing communications (such as requests or responses to other devices) in the form of one or more packets in memory 1003 and communicated to network 1030 from network interface 1020. Processor(s) 1001 may access these communication packets stored in memory 1003 for processing.

Examples of the network interface 1020 include, but are not limited to, a network interface card, a modem, and any combination thereof. Examples of a network 1030 or network segment 1030 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1030, may employ a wired and/or a wireless mode of communication. In general, any network topology may be used.

Information and data can be displayed through a display 1032. Examples of a display 1032 include, but are not limited to, a liquid crystal display (LCD), an organic liquid crystal display (OLED), a cathode ray tube (CRT), a plasma display, and any combinations thereof. The display 1032 can interface to the processor(s) 1001, memory 1003, and fixed storage 1008, as well as other devices, such as input device(s) 1033, via the bus 1040. The display 1032 is linked to the bus 1040 via a video interface 1022, and transport of data between the display 1032 and the bus 1040 can be controlled via the graphics control 1021.

In addition to a display 1032, computer system 1000 may include one or more other peripheral output devices 1034 including, but not limited to, an audio speaker, a printer, a check or receipt printer, and any combinations thereof. Such peripheral output devices may be connected to the bus 1040 via an output interface 1024. Examples of an output interface 1024 include, but are not limited to, a serial port, a parallel connection, a USB port, a FIREWIRE port, a THUNDERBOLT port, and any combinations thereof.

In addition, or as an alternative, computer system 1000 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 1000 shown in FIG. 10 such as, but not limited to, the network 1030, processor 1001, memory, 1003, etc., may comprise a cloud computing system. In one such system, front-end systems such as input devices 1033 may provide information to back-end platforms such as servers (e.g. computer systems 1000) and storage (e.g., memory 1003). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Additional Embodiments

In one aspect, this disclosure describes a method of generating computer responses to external communications. The method can include identifying one or more sequences of characters in an incoming electronic message entering a private network, the sequence representing an idea. The method can also include parsing the characters into words and symbols or relevant phrases and assigning a score to each of the words or phrases. The method can further include calculating a total of the scores assigned to each of the words in the idea, and determining a sentiment of the electronic message based on the scores. The scores can be tabulated at the individual level or in aggregate for later comparison as an overall numeric or grade-based score based on the risk scores in the aggregate of the company and in comparison to scores at other modeled companies. The method can include storing the sentiment in a database residing on a memory device, and associating the sentiment with a personality profile. Yet further, the method can include identifying the creation of an outgoing message within the private network addressed to a person associated with the personality profile, and generating suggestions for the outgoing message. The method can yet further include displaying one or more of the suggestions on a display associated with the creation of the outgoing message.

In another aspect of the disclosure, a method for generating computer responses to external communications is disclosed. The method can include recording keystrokes on a first computing device, the keystrokes being part of a digital message or a voice message being transcribed to digital text and evaluated from that digitization. The method can include identifying an end of a first sequence of keystrokes, the first sequence representing an idea. The method can also include parsing the keystrokes into words and symbols, and assigning a score to each of the words. The method can further include calculating a first total of the scores assigned to each of the words or grouping of words in the idea. Also, the method can include calculating a second total of scores assigned to each word or grouping of words in a plurality of ideas in the digital message, the second total including the first total. Yet further, the method can include determining that the second total exceeds a threshold. The method can also include a warning to the user to take action based on determining that the word or phrase was risk scored beyond a threshold. In other cases, the method may include precluding the digital message from leaving the first computing device until the digital message is modified to accord with suggested text that is displayed on a display of the first computing device. Upon determining that appropriate modifications have been done to the message, the method may comprise allowing the digital message to leave the first computing device.

Yet another aspect of the disclosure describes a non-transitory, tangible computer readable storage medium, encoded with processor readable instructions to perform a method for generating computer responses to external communications. The method can include identifying one or more sequences of characters in an incoming electronic message entering a private network, the sequence representing an idea. The method can also include parsing the characters into words and symbols or phrases and assigning a score to each of the words or phrases. The method can further include calculating a total of the scores assigned to each of the words in the idea, and determining a sentiment of the electronic message based on the scores. This sentiment can be evaluated at the individual word, symbol or phrase level or can be aggregated into a numeric, alphanumeric, or symbol-based sentiment analysis score based on the aggregate of the scores at the company over a length of time or even in comparison to scores of other external entities over a similar period. The method can include storing the sentiment in a database residing on a memory device, and associating the sentiment with a personality profile. Yet further, the method can include identifying the creation of an outgoing message within the private network addressed to a person associated with the personality profile and generating suggestions for the outgoing message. The method can yet further include displaying one or more of the suggestions on a display associated with the creation of the outgoing message.

Yet another aspect of the disclosure describes a method of monitoring keystrokes and determining whether to pass those keystrokes to a target application. The method can comprise capturing keystrokes from text input hardware device. The method can also comprise, at an end of each sentence, determining if the sentence is non-compliant by: checking the sentence for any typos; generating a first list of suggested typo fixes; generating a second list of suggested sentences, each suggested sentence incorporating one of the suggested typo fixes from the first list; determining a risk score for the suggested sentences in the second list; aggregating all of the risk scores to form an aggregated risk score for the sentence; and comparing the aggregated risk score to a compliance violation threshold. If the aggregated risk score exceeds the compliance violation threshold, then deeming the sentence non-compliant and precluding at least a last keystroke of the keystrokes from reaching the target application.

Another aspect of the disclosure describes a method of monitoring keystrokes and determining whether to pass those keystrokes to a target application. The method can comprise capturing keystrokes from text input hardware device. The method can also comprise, at an end of each sentence, determining if the sentence is non-compliant by: determining an aggregated risk score for each sentence by identifying possible typo-based variations on the sentence, scoring the possible typo-based variations, and aggregating scores for the possible typo-based variations; comparing the aggregated risk score to a compliance violation threshold; and if the aggregated risk score exceeds the compliance violation threshold, then blocking at least a last keystroke of the keystrokes from being passed to the target application.

Yet another aspect of the disclosure describes a non-transitory, tangible computer readable storage medium, encoded with processor readable instructions to perform a method for monitoring keystrokes and determining whether to pass those keystrokes to a target application. The method can comprise capturing keystrokes from text input hardware device. The method can also comprise, at an end of each sentence, determining if the sentence is non-compliant by: determining an aggregated risk score for each sentence by identifying possible typo-based variations on the sentence, scoring the possible typo-based variations, and aggregating scores for the possible typo-based variations; comparing the aggregated risk score to a compliance violation threshold; and if the aggregated risk score exceeds the compliance violation threshold, then blocking at least a last keystroke of the keystrokes from being passed to the target application.

Yet another aspect of the disclosure describes a method of preventing corporate- and legal compliance-violating messages by precluding keystrokes associated with non-compliant messages from reaching a target application via operations occurring between hardware and application layers of a computing device. The method can comprise capturing a keystroke data signal from a text input hardware device of the computing device, the keystroke data signal representing at least a sentence or a phrase. The method can also comprise, at an end of the sentence or phrase, determining, via a processor, if the sentence or phrase is non-compliant by: checking the sentence or phrase for any typos; generating a first list of suggested typo fixes; generating a second list of suggested sentences or phrases, each of the suggested sentences or phrases incorporating one of the suggested typo fixes from the first list of suggested typo fixes; determining risk scores for suggested sentences or phrases in the second list of suggested sentences or phrases; aggregating the risk scores for the suggested sentences to form an aggregated risk score for the sentence or phrase; and comparing the aggregated risk score to a compliance violation threshold. The method can also comprise, if the aggregated risk score exceeds the compliance violation threshold, then deeming the sentence or phrase non-compliant and, at a layer between a hardware and an application layer, precluding at least a portion of the keystroke data signal from reaching the target application in the application layer.

Yet another aspect of the disclosure describes a method of preventing corporate- and legal compliance-violating messages by precluding keystrokes associated with non-compliant messages from reaching a target application via operations occurring between hardware and application layers of a computing device. The method can comprise capturing a keystroke data signal from a text input hardware device of the computing device, the keystroke data signal representing at least a sentence or phrase. The method can also comprise, at an end of each sentence or phrase, determining, via a processor, if the sentence or phrase is non-compliant by: determining an aggregated risk score for each sentence or phrase by identifying possible typo-based variations on the sentence or phrase, scoring the possible typo-based variations, and aggregating scores for the possible typo-based variations; and comparing the aggregated risk score to a compliance violation threshold. The method can also comprise if the aggregated risk score exceeds the compliance violation threshold, then deeming the sentence or phrase non-compliant and, at a layer between a hardware and an application layer, precluding at least a portion of the keystroke data signal from reaching the target application in the application layer.

Another aspect of the disclosure describes a non-transitory, tangible computer readable storage medium, encoded with processor readable instructions to perform a method of warning, training, education and/or preventing corporate- and legal compliance-violating messages by precluding keystrokes associated with non-compliant messages from reaching a target application via operations occurring between hardware and application layers of a computing device. The method can comprise capturing a keystroke data signal from a text input hardware device of the computing device, the keystroke data signal representing at least a sentence or phrase. The method can also comprise, at an end of each sentence or phrase, determining, via a processor, if the sentence or phrase is non-compliant by: determining an aggregated risk score for each sentence or phrase by identifying possible typo-based variations on the sentence or phrase, scoring the possible typo-based variations, and aggregating scores for the possible typo-based variations; and comparing the aggregated risk score to a compliance violation threshold. The method can also comprise if the aggregated risk score exceeds the compliance violation threshold, then deeming the sentence or phrase non-compliant and, at a layer between a hardware and an application layer, precluding at least a portion of the keystroke data signal from reaching the target application in the application layer.

In some embodiments, emotional checks, or comparisons to personality profiles, can be used on inbound and outbound messaging (e.g., e-mail, IMs) to help employees better communicate by extracting and providing emotional context, including suggestions for responses, based on a personality or sentiment of a recipient.

Existing technologies allow personality profiles to be generated based on analysis of public communications and content that people generate (e.g., NLP Sentiment Technology). For instance, analysis of public FACEBOOK, TWITTER, and LINKEDIN content can be used to create personality profiles for content generators. To simplify the personality profile generation, content creators can be placed into buckets, personas, or any other logical grouping, thus greatly narrowing the number of different personalities available to the analysis. For instance, a personality bucket may include "easy to anger," "gullible," or "compassionate" to name three non-limiting examples. However, personality profiles can also be numeric. For instance, various personality profile tests known to those of skill in the art include vector graphs showing different personalities. Thus, a number or vector can be assigned to a personality profile. Additionally, the personality profile that a person is assigned may be multi-dimensional and can include one or multiple personalities. For example, a person may be assigned to a profile that includes both "compassionate" and "introverted." It is possible for groupings to also be based on both a personality or sentiment analyzer grouping and a demographic grouping like income or presence of children.

In some embodiments, personality profiles may even be created for internal employees so inbound customer transactions may be matched between customer and employee whose personality profiles complement each other. In some embodiments, personality profiles can also be overlayed against home or demographic data using IP address of computers to the router IP address to create more robust view of the home dynamic for marketing, advertising, and content distribution purposes.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for analyzing a digital message for presence of a non-compliant expression within the digital message, the digital message including at least one segment and being created using a computing device including a text input hardware device, the method comprising:
    capturing keystrokes at the text input hardware device;
    analyzing the keystrokes to capture the digital message including an end of the at least one segment; and
    assessing the at least one segment for presence of a concept flag in the at least one segment, the concept flag being associated with the non-compliant expression, wherein assessing includes
        obtaining a relation pattern for the concept flag,
        generating a dependency parse graph for the at least one segment,
        comparing the dependency parse graph to the relation pattern, and
        if at least a portion of the dependency parse graph matches the relation pattern, then concluding the at least one segment contains the concept flag associated with the non-compliant expression.

2. The method of claim 1, further comprising:
blocking the at least one segment containing the non-compliant expression from being transmitted from the computing device.

3. The method of claim 2,
wherein the at least one segment comprises a plurality of portions, and
wherein blocking includes
    providing a block threshold value;
    assigning a score to each one of the plurality of portions of the at least one segment based on the assessing;
    summing scores of the plurality of portions of the at least one segment to generate a sum score;
    comparing the sum score to the block threshold value; and
    if the sum score exceeds the block threshold value, then precluding the at least one segment containing the concept flag from being transmitted from the computing device.

4. The method of claim 1, further comprising:
displaying a notification on the computing device, the notification including an indication of the non-compliant expression contained in the at least one segment.

5. The method of claim 1,
wherein the concept flag includes a plurality of concept flag parts, each one of the plurality of concept flag parts being associated with a set of word alternatives related to the non-compliant expression,
wherein assessing the at least one segment includes:
    separating the at least one segment into individual words,
    determining a lemma for each one of the individual words, and
    for the lemma determined for each one of the individual words, analyzing whether the lemma corresponds to one of the plurality of concept flag parts.

6. The method of claim 5, wherein generating the dependency parse graph for the at least one segment includes
    setting each one of the individual words as a node in the at least one segment,
    representing any relation between nodes as edges, and
    identifying a relation pattern from the edges.

7. The method of claim 5, wherein assessing the at least one segment further includes considering exceptions for the lemma determined for each one of the individual words, the exceptions including at least one of inflections of lemmas and jargon words.

8. The method of claim 5, wherein assessing the at least one segment further includes considering relations between lemmas determined for different ones of the individual words using a token lemma filter.

9. A system for analyzing a digital message for presence of a non-compliant expression within the digital message, the digital message being created using a computing device including a text input hardware device, the system comprising:
    one or more processing devices and memory communicatively coupled with and readable by the one or more processing devices, the memory comprising processor-readable instructions which, when executed by the one or more processing devices, cause the one or more processing devices to perform actions comprising:

capturing keystrokes at the text input hardware device associated with creation of the digital message, the digital message including at least one segment;

analyzing the keystrokes to capture the at least one segment and identifying an end of the at least one segment;

assessing the at least one segment for presence of a concept flag in the at least one segment, the concept flag being associated with the non-compliant expression, assessing including obtaining a relation pattern for the concept flag, generating a dependency parse graph for the at least one segment, comparing the dependency parse graph to the relation pattern, and if at least a portion of the dependency parse graph matches the relation pattern, then concluding the at least one segment contains the concept flag associated with the non-compliant expression.

10. The system of claim 9, further comprising:

blocking the at least one segment containing the non-compliant expression from being transmitted from the computing device.

11. The system of claim 9, further comprising:

displaying a notification on the computing device, the notification including an indication of the non-compliant expression contained in the at least one segment.

12. The system of claim 9, wherein the digital message includes at least one of an email, an instant message (IM), a message sent using a short message service (SMS) application, a text message, a social media message, and a social media comment.

13. One or more non-transitory, machine-readable media having machine-readable instructions thereon which, when executed by one or more processing devices, cause the one or more processing devices to perform actions comprising:

capturing keystrokes at a text input hardware device associated with creation of a digital message, the digital message including at least one segment, analyzing the keystrokes to capture the at least one segment and identifying an end of the at least one segment;

assessing the at least one segment for presence of a concept flag in the at least one segment, the concept flag being associated with a non-compliant expression, assessing including obtaining a relation pattern for the concept flag, generating a dependency parse graph for the at least one segment, comparing the dependency parse graph to the relation pattern, and if at least a portion of the dependency parse graph matches the relation pattern, then concluding the at least one segment contains the concept flag associated with the non-compliant expression.

14. The one or more non-transitory, machine-readable media of claim 13 further comprising:

blocking the at least one segment containing the non-compliant expression from being transmitted from a computing device.

15. The one or more non-transitory, machine-readable media of claim 13 further comprising:

displaying a notification on a computing device, the notification including an indication of the non-compliant expression contained in the at least one segment.

16. The one or more non-transitory, machine-readable media of claim 13 wherein the digital message includes at least one of an email, an instant message (IM), a message sent using a short message service (SMS) application, a text message, a social media message, and a social media comment.

* * * * *